US009680583B2

(12) United States Patent
Heffernan

(10) Patent No.: US 9,680,583 B2
(45) Date of Patent: Jun. 13, 2017

(54) METHODS AND APPARATUS TO REPORT REFERENCE MEDIA DATA TO MULTIPLE DATA COLLECTION FACILITIES

(71) Applicant: The Nielsen Company (US), LLC, Schaumburg, IL (US)

(72) Inventor: Ronan Heffernan, Wesley Chapel, FL (US)

(73) Assignee: THE NIELSEN COMPANY (US), LLC, New York, NY (US)

(*) Notice: Subject to any disclaimer, the term of this patent is extended or adjusted under 35 U.S.C. 154(b) by 0 days.

(21) Appl. No.: 14/673,236

(22) Filed: Mar. 30, 2015

(65) Prior Publication Data

US 2016/0294495 A1    Oct. 6, 2016

(51) Int. Cl.
*H04H 60/33*    (2008.01)
*G06Q 30/02*    (2012.01)
*H04H 60/56*    (2008.01)
*H04H 60/37*    (2008.01)

(52) U.S. Cl.
CPC ......... *H04H 60/33* (2013.01); *G06Q 30/0201* (2013.01); *H04H 60/37* (2013.01); *H04H 60/56* (2013.01)

(58) Field of Classification Search
CPC .. H04H 60/33; H04N 21/2181; H04N 21/231; H04N 21/239; H04N 21/2665; H04N 21/812
See application file for complete search history.

(56) References Cited

U.S. PATENT DOCUMENTS

| 4,677,466 A | 6/1987 | Lert, Jr. et al. |
| 4,769,697 A | 9/1988 | Gilley et al. |
| 4,955,000 A | 9/1990 | Nastrom |
| 5,119,104 A | 6/1992 | Heller |

(Continued)

FOREIGN PATENT DOCUMENTS

| JP | 2003125102 | 4/2003 |
| JP | 2003279400 | 10/2003 |

(Continued)

OTHER PUBLICATIONS

Fang et al., "Design of a Wireless Assisted Pedestrian Dead Reckoning System—The NavMote Experience," vol. 54, Issue 6, Institute of Electrical and Electronics Engineers (IEEE), Dec. 2005 (16 pages).

(Continued)

*Primary Examiner* — Pankaj Kumar
*Assistant Examiner* — Alexander Boyd
(74) *Attorney, Agent, or Firm* — Hanley, Flight & Zimmerman, LLC

(57) ABSTRACT

Methods and apparatus to report reference media data to multiple data collection facilities are disclosed. An example method includes determining whether a reference media monitoring site located in a first reference area is within a threshold distance of a second reference area. The reference media monitoring site providing reference media data to a first data collection facility associated with the first reference area. The example method also includes transmitting the reference media data to a second data collection facility associated with the second reference area if the reference media monitoring site is within the threshold distance.

24 Claims, 8 Drawing Sheets

(56) References Cited

U.S. PATENT DOCUMENTS

| | | |
|---|---|---|
| 5,133,081 A | 7/1992 | Mayo |
| 5,146,231 A | 9/1992 | Ghaem et al. |
| 5,387,993 A | 2/1995 | Heller et al. |
| 5,481,294 A | 1/1996 | Thomas et al. |
| 5,640,144 A | 6/1997 | Russo et al. |
| 5,774,876 A | 6/1998 | Woolley et al. |
| 5,812,930 A | 9/1998 | Zavrel |
| 5,815,114 A | 9/1998 | Speasl et al. |
| 5,893,093 A | 4/1999 | Wills |
| 5,982,808 A | 11/1999 | Otto |
| 6,002,918 A | 12/1999 | Heiman et al. |
| 6,098,048 A | 8/2000 | Dashefsky et al. |
| 6,252,522 B1 | 6/2001 | Hampton et al. |
| 6,396,413 B2 | 5/2002 | Hines et al. |
| 6,424,264 B1 | 7/2002 | Giraldin et al. |
| 6,430,498 B1 | 8/2002 | Maruyama et al. |
| 6,433,689 B1 | 8/2002 | Hovind et al. |
| 6,470,264 B2 | 10/2002 | Bide |
| 6,493,649 B1 | 12/2002 | Jones et al. |
| 6,563,423 B2 | 5/2003 | Smith |
| 6,563,430 B1 | 5/2003 | Kemink et al. |
| 6,654,800 B1 | 11/2003 | Rieger, III |
| 6,731,942 B1 | 5/2004 | Nageli |
| 6,748,317 B2 | 6/2004 | Maruyama et al. |
| 6,862,541 B2 | 3/2005 | Mizushima |
| 6,882,837 B2 | 4/2005 | Fernandez et al. |
| 6,898,434 B2 | 5/2005 | Pradhan et al. |
| 6,919,803 B2 | 7/2005 | Breed |
| 6,928,280 B1 | 8/2005 | Xanthos et al. |
| 6,940,403 B2 | 9/2005 | Kail, IV |
| 6,958,710 B2 | 10/2005 | Zhang et al. |
| 6,965,683 B2 | 11/2005 | Hein, III |
| 6,970,131 B2 | 11/2005 | Percy et al. |
| 7,038,619 B2 | 5/2006 | Percy et al. |
| 7,046,162 B2 | 5/2006 | Dunstan |
| 7,080,061 B2 | 7/2006 | Kabala |
| 7,099,676 B2 | 8/2006 | Law et al. |
| 7,126,454 B2 | 10/2006 | Bulmer |
| 7,363,028 B2 | 4/2008 | de Clerq et al. |
| 7,460,684 B2 | 12/2008 | Srinivasan |
| 7,460,827 B2 | 12/2008 | Schuster et al. |
| 7,596,542 B1 | 9/2009 | Woll |
| 7,739,705 B2 | 6/2010 | Lee et al. |
| 7,793,318 B2 | 9/2010 | Deng |
| 7,966,339 B2 | 6/2011 | Kim |
| 8,151,297 B2 | 4/2012 | McCoy et al. |
| 8,255,938 B2 | 8/2012 | Lee et al. |
| 8,457,972 B2 | 6/2013 | Topchy et al. |
| 8,600,531 B2 | 12/2013 | Topchy et al. |
| 8,627,507 B2 | 1/2014 | Stasi et al. |
| 8,650,243 B2 | 2/2014 | Riordan et al. |
| 8,738,763 B2 | 5/2014 | Crystal et al. |
| 2002/0097885 A1 | 7/2002 | Birchfield et al. |
| 2003/0088873 A1 | 5/2003 | McCoy et al. |
| 2003/0122708 A1 | 7/2003 | Percy et al. |
| 2003/0146871 A1 | 8/2003 | Karr et al. |
| 2003/0171833 A1 | 9/2003 | Crystal et al. |
| 2003/0222819 A1 | 12/2003 | Karr et al. |
| 2003/0222820 A1 | 12/2003 | Karr et al. |
| 2004/0002310 A1 | 1/2004 | Herley et al. |
| 2004/0027271 A1 | 2/2004 | Schuster et al. |
| 2004/0095276 A1 | 5/2004 | Krumm et al. |
| 2004/0198386 A1 | 10/2004 | Dupray |
| 2004/0266457 A1 | 12/2004 | Dupray |
| 2005/0035857 A1 | 2/2005 | Zhang et al. |
| 2005/0141345 A1 | 6/2005 | Holm et al. |
| 2005/0201826 A1 | 9/2005 | Zhang et al. |
| 2005/0232411 A1 | 10/2005 | Srinivasan et al. |
| 2005/0244011 A1 | 11/2005 | Kim |
| 2006/0153296 A1 | 7/2006 | Deng |
| 2006/0184961 A1 | 8/2006 | Lee et al. |
| 2006/0195861 A1 | 8/2006 | Lee |
| 2007/0266395 A1 | 11/2007 | Lee et al. |
| 2007/0274537 A1 | 11/2007 | Srinivasan |
| 2008/0024809 A1* | 1/2008 | Brownstein ........ H04N 1/00132 358/1.12 |
| 2008/0091288 A1 | 4/2008 | Srinivasan |
| 2008/0115165 A1* | 5/2008 | Choi ................. H04N 21/4622 725/44 |
| 2008/0276265 A1 | 11/2008 | Topchy et al. |
| 2009/0037575 A1 | 2/2009 | Crystal et al. |
| 2010/0199296 A1 | 8/2010 | Lee et al. |
| 2011/0019835 A1 | 1/2011 | Schmidt et al. |
| 2011/0029237 A1* | 2/2011 | Kamalski ........... G01C 21/3661 701/532 |
| 2011/0091055 A1 | 4/2011 | LeBlanc |
| 2011/0239245 A1 | 9/2011 | Croy et al. |
| 2012/0023538 A1* | 1/2012 | Hattori ............... H04N 21/6405 725/110 |
| 2012/0148058 A1 | 6/2012 | Chen |
| 2012/0148067 A1 | 6/2012 | Peterson et al. |
| 2012/0278344 A1 | 11/2012 | Berg et al. |
| 2013/0212275 A1* | 8/2013 | Viswanathan ............ G06F 9/50 709/226 |
| 2013/0261781 A1 | 10/2013 | Topchy et al. |
| 2013/0312019 A1* | 11/2013 | McMillan ........ H04N 21/42203 725/14 |
| 2014/0088742 A1 | 3/2014 | Srinivasan et al. |
| 2014/0101685 A1* | 4/2014 | Kitts ................ H04N 21/44213 725/14 |
| 2014/0250448 A1 | 9/2014 | Nielsen |
| 2014/0259039 A1 | 9/2014 | Nielsen |
| 2014/0304391 A1 | 10/2014 | George et al. |
| 2014/0325551 A1 | 10/2014 | McMillan |
| 2015/0033246 A1 | 1/2015 | Gideon et al. |

FOREIGN PATENT DOCUMENTS

| | | |
|---|---|---|
| JP | 2010257278 | 11/2010 |
| JP | 2012095014 | 5/2012 |
| WO | 88/10540 | 12/1988 |
| WO | 91/11062 | 7/1991 |
| WO | 99/55057 | 10/1999 |
| WO | 03077455 | 9/2003 |
| WO | 03087871 | 10/2003 |
| WO | 2004051303 | 6/2004 |
| WO | 2004051304 | 6/2004 |
| WO | 2006037014 | 4/2006 |
| WO | 2006096177 | 9/2006 |
| WO | 2006121681 | 11/2006 |

OTHER PUBLICATIONS

Bernstein et al., "An Introduction to Map Matching for Personal Navigation Assistants," New Jersey TIDE Center, New Jersey Institute of Technology, Aug. 1996 (17 pages).

McCarthy et al., "RF Free Ultrasonic Positioning," Department of Computer Science, University of Bristol, U.K., 2003 (7 pages).

McCarthy et al., "RF Free Ultrasonic Positioning (Presentation)," 7th International Symposiom on Wearable Computers, Oct. 2003 (12 pages).

Gentile et al., "Robust Location using System Dynamics and Motion Constraints," National Institute of Standards and Technology, Wireless Communication Technologies Group, Jun. 24, 2004 (5 pages).

Cricket Project, "Cricket v2 User Manual," MIT Computer Science and Artificial Intelligence Lab, Cambridge, U.S.A., Jan. 2005 (57 pages).

Holm, Sverre, "Technology Presentation," [online]. Sonitor Technologies, May 26, 2004 [retrieved on Oct. 13, 2004]. Retrieved from the Internet: <URL: www.sonitor.com/news/article.asp?id=62> (16 pages).

"The Nibble Location System," [online]. UCLA, May 21, 2001 [retrieved on Nov. 2, 2004]. Retrieved from the Internet: <URL: http://mmsl.cs.ucla.edu/nibble/>. (13 pages).

"New Sonitor Patent Combines Ultrasound and RFID," [online]. Sonitor Technologies, Feb. 17, 2005 [retrieved on Jun. 13, 2005]. Retrieved from the Internet: <URL: http://sonitor.com/news/article.asp?id=73>. (1 page).

(56) References Cited

OTHER PUBLICATIONS

"NIST Location System," [online]. Wireless Communication Technologies Group, National Institute of Standards and Technology, Mar. 12, 2004 [retrieved in Nov. 1, 2004]. Retrieved from the Internet: <URL: www.antd.nist.gov>. (2 pages).

"Dust Networks—SmartMesh," [online]. Dust Networks Inc., 2002 [retrieved on Sep. 29, 2004]. Retrieved from the Internet: <URL: www.dustnetworks.com>. (2 pages).

Kanellos, Michael, "Dust Makes Mesh of Wireless Sensors," [online]. CNET News.com, Sep. 20, 2004 [retrieved on Sep. 29, 2004]. Retrieved from the Internet: <URL: http://www.news.com/Dust-makes-mesh-of-wireless-sensors/2100-1008_3-5374971.html?tag=item>. (2 pages).

"University Library Navigation Enabled by Ekahau," [online]. Directions Magazine, Jun. 12, 2003 [Aug. 3, 2007]. Retrieved from the Internet: <URL: http://www/directionsmag.com/press.releases/index.php?duty=Show&id=7276&trv=1>. (3 pages).

Yeung, K.L., & Yum, T.-S.P. "A Comparative Study on Location Tracking Strategies in Cellular Mobile Radio Systems," Global Telecommunications Conference, 1995. Globecom '95, IEEE, Nov. 14-26, 1995 (pp. 22-28 vol. 1).

Battiti, Roberto, et al. "Location-Aware Computing: a Neutral Network Model for Determining Location in Wireless LANS" University of Trento: Department of Information and Communication Technology, Technical Report #DIT-02-0083, Feb. 2002 (pp. 1-16).

Azondekon et al., "Service Selection in Networks Based on Proximity Confirmation Using Infrared", http://www.scs.carleton.ca/~barbeau/Publications/2002/azondekon.pdf, International Conference on Telecommunications (ICT) Beijing, 2002 (5 Pages).

Bahl et al., "A Software System for Locating Mobile Users: Design, Evaluation, and Lessons," Technical Report MSR-TR-2000-12 Microsoft Research, [retrieved from internet, http://research.microsoft.com/~bahl/Papers/Pdf/radar.pdf] Feb. 2000 (13 pages).

Heffernan et al., "Systems and Methods to Verify and/or Correct Media Lineup Information", U.S. Appl. No. 14/511,805, filed Oct. 10, 2014, 77 pages.

McMillan, Gavin, "Methods and Apparatus to Verify and/or Correct Media Lineup Information", U.S. Appl. No. 14/473,639, filed Aug. 29, 2014, 64 pages.

European Patent Office, "Extended European search report," issued in connection with European Patent Application 16 00 0637.5, dated Aug. 5, 2016, 8 pages.

Canadian Intellectual Property Office, "Office Action," issued in connection with Canadian Patent Application No. 2,923,771, dated Feb. 8, 2017, 4 pages.

\* cited by examiner

METHODS AND APPARATUS TO REPORT REFERENCE MEDIA DATA TO MULTIPLE DATA COLLECTION FACILITIES

FIELD OF THE DISCLOSURE

This disclosure relates generally to audience measurement, and, more particularly, to methods and apparatus to report reference media data to multiple data collection facilities.

BACKGROUND

Audience measurement has traditionally been performed using methods such as having panelists keep a log or diary of media exposure and/or using physical meter devices to detect media usage and/or exposure in an automated fashion. Often, the automatic detection of media exposure depends upon the collection of signatures and/or watermarks from the media that are compared with reference media data.

DETAILED DESCRIPTION

Figure 1:
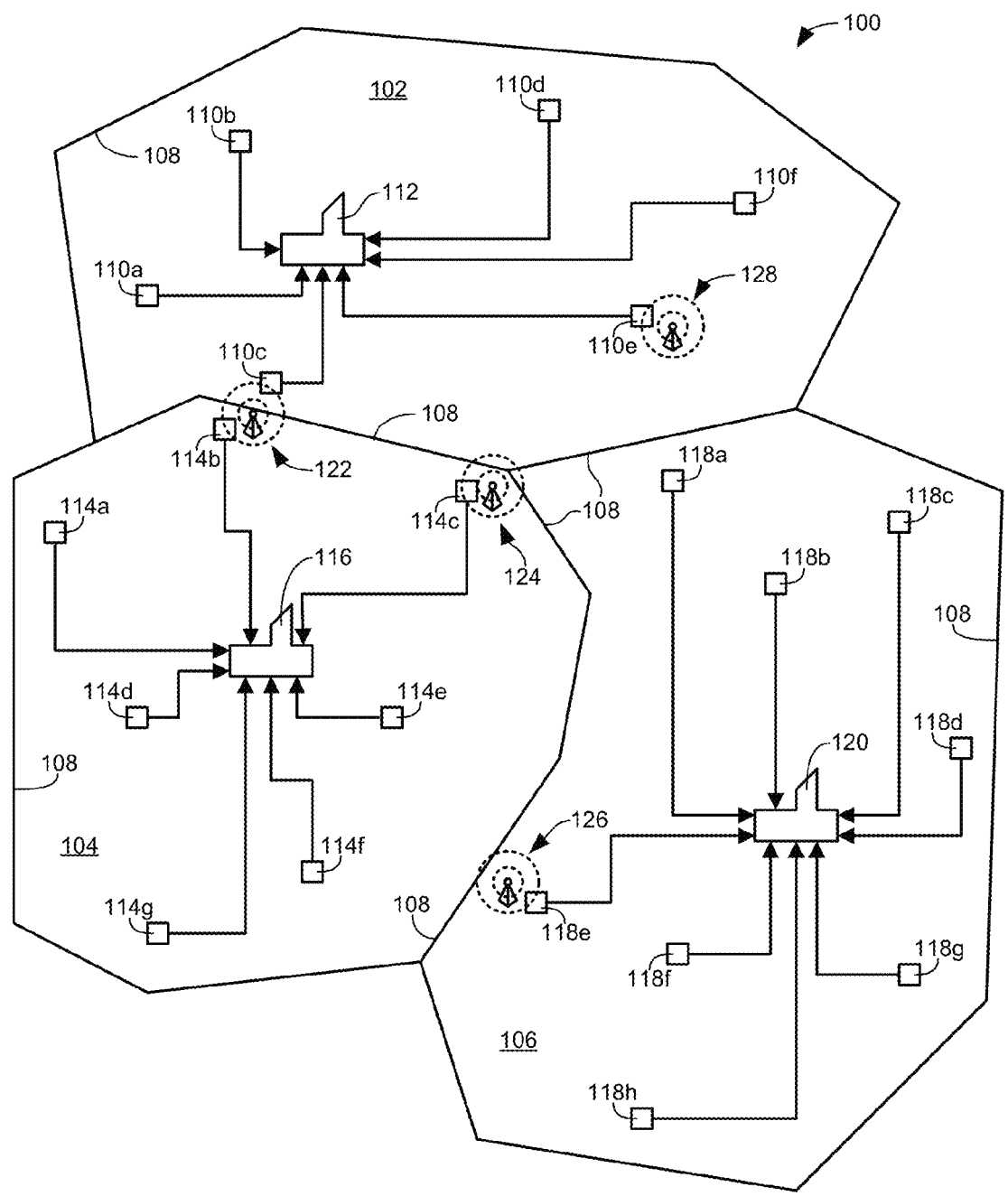
FIG. 1 illustrates an example environment in which the teachings disclosed herein may be implemented.

Frequently, media monitoring entities (e.g., The Nielsen Company (US), LLC) enlist panelists from which audience measurement data is collected. The audience measurement data is indicative of the media to which the panelists are exposed. In many traditional forms of media, such as, for example, television and radio, the collected audience measurement data often includes an indication of the time during which a panelist is exposed to media and an indication of the source of the media (e.g., the network, station, and/or channel to which a panelist's media presentation device is tuned). Based on the source identifying information and the time when the media was accessed, media monitoring entities can look up the identified source (e.g., network, station, and/or channel) at the identified time in a media lineup table to specifically identify the media program(s) to which the panelist was exposed.

An example method to collect audience measurement data from panelists is through the use of watermarking and/or signatures. Watermarking is a technique used to identify media such as television broadcasts, radio broadcasts, advertisements (television and/or radio), downloaded media, streaming media, prepackaged media, etc. Watermarking includes audio watermarking and video watermarking. Existing audio watermarking techniques identify media by embedding one or more audio codes (e.g., one or more watermarks), such as media identifying information and/or an identifier that may be mapped to media identifying information (e.g., via a lookup in a media lineup table), into an audio component of a media signal. Video watermarking is analogous to audio watermarking, but a video watermark is placed in a video component of the media signal. In some examples, the audio or video component is selected to have a signal characteristic sufficient to hide the corresponding audio and/or video watermark.

As used herein, the terms "code" or "watermark" are used interchangeably and are defined to mean any identification information (e.g., an identifier) that may be associated with media (e.g., a program or advertisement) for the purpose of identifying the media and/or for another purpose such as tuning (e.g., a packet identifying header). As used herein "media" refers to audio and/or visual (still or moving) content and/or advertisements. To identify watermarked media, the watermark(s) are extracted and used to access a table of reference watermarks that are mapped to media identifying information.

Unlike media monitoring techniques based on codes and/or watermarks included with and/or embedded in the monitored media, fingerprint or signature-based media monitoring techniques generally use one or more inherent characteristics of the monitored media during a monitoring time interval to generate a substantially unique proxy for the media. Such a proxy is referred to as a signature or fingerprint, and can take any form (e.g., a series of digital values, a waveform, etc.) representative of any aspect(s) of the media signal(s) (e.g., the audio and/or video signals forming the media presentation being monitored). A good signature is repeatable when processing the same media presentation, but is unique relative to other (e.g., different) presentations of other (e.g., different) media. The term "fingerprint" and "signature" are used interchangeably herein and are defined herein to mean a proxy for identifying media that is generated from one or more inherent characteristics of the media. That is, while a single item of signature data may correspond to a fraction of a second of media (and, thus, unlikely sufficient to uniquely identify the media), as used herein a signature (or fingerprint) corresponds to a stream of such individual items of signature data sufficiently long to identify the associated media relative to other media with a relatively high level of confidence. The particular length of such signatures may differ depending upon the nature of the media and/or the level of confidence desired.

Signature-based media monitoring generally involves determining (e.g., generating and/or collecting) signature(s) representative of a media signal (e.g., an audio signal and/or a video signal) output by a monitored media device and comparing the monitored signature(s) to one or more reference signatures corresponding to known (e.g., reference) media sources. Various comparison criteria, such as a cross-correlation value, a Hamming distance, etc., can be evaluated to determine whether a monitored signature matches a particular reference signature. When a proper degree match between the monitored signature and one of the reference signatures is found, the monitored media can be identified as corresponding to the particular reference media represented by the reference signature that is matched with the monitored signature. Attributes, such as an identifier of the media, a presentation time, a broadcast channel, etc., are collected for the reference signature. Thus, these attributes may then be associated with the monitored media whose monitored signature matched the reference signature. Example systems for identifying media based on codes and/or signatures are long known and were disclosed in Thomas, U.S. Pat. No. 5,481,294, which is hereby incorporated by reference in its entirety.

While signatures or fingerprints are, by their nature, uniquely associated with the media programs they represent, their utility in actually identifying a particular media program depends on the existence of a corresponding reference signature to which collected signature data can be matched. The rapid increase in media sources (e.g., cable television channels, satellite television, etc.) means that such reference signatures are sometimes unavailable because new content (e.g., new episodes in a television series) is often being produced for which no reference data (e.g., signatures) is available. To resolve this issue, a media monitoring entity may set up multiple media monitoring reference sites with one or more receivers each tuned to a particular station, channel, or other source of media. The media monitoring reference site are configured such that each receiver continuously records and/or collects reference media data associated with media presented on the corresponding station or channel as the media is being broadcast. The media monitoring entity configures and/or defines the particular source (e.g., station, channel, etc.) of media to which each receiver is tuned such that the reference media data collected by each receiver is from a known source. Further, in some examples, as the reference media data is collected, the data is timestamped such that time when the media was presented and/or broadcast is also known. In this manner, reference media data associated with a known source at a known time is collected to then be used as a reference to match with audience measurement data received from audience member panelists to identify the media to which such panelists are exposed. Accordingly, such reference media data collected at a media monitoring reference may be used for reference in identifying media to which audience panelists are exposed. In some examples, the reference media data includes the media content being broadcast. In some examples, the reference media data includes closed captioning text, event information table (EIT) data, and/or other metadata broadcast with the media content. In some examples, the reference media data includes signatures and/or codes generated and/or detected from the media by the media monitoring reference site. In some examples, the collected reference media data is sent to a centralized back office or data collection facility for storage and subsequent processing and/or analysis.

As just mentioned, in some examples, the data collection facility also receives audience measurement data collected from an audience measurement site (e.g., a set top box in a panelist's home) for comparison to the reference media data. When the audience measurement data (e.g., signatures obtained from a panelist) matches the reference media data (e.g., reference signatures collected at a media monitoring reference site), the panelist may be credited with exposure to the corresponding media. In this manner, the media monitoring entity may identify the media to which panelists have been exposed thereby enabling the determination of audience measurement metrics (e.g., media ratings, advertising reach, etc.). In addition to comparing reference signatures of reference media data with signatures from audience measurement data, in some examples, the media monitoring reference site may record a copy of all content broadcast on the particular channel(s) or station(s) being monitored over an extended period of time (e.g., one year) as a reference to look back and resolve any discrepancies arising in the audience measurement analysis (e.g., due to inconsistencies in media lineup information).

In some instances, a media monitoring entity may implement multiple reference media monitoring sites at different locations to collect reference media data corresponding to any number of sources of media to which panelists may be exposed. For example, different media monitoring reference sites may be implemented in different regions to collect reference media data corresponding to local media programming specific to each region. In some such examples, each of the different media monitoring sites report or transmit corresponding reference media data to a single data collection facility maintaining one or more servers to receive and subsequently process the data. Where there are many reference media monitoring sites, the volume of data being collected and sent to the data collection facility may challenge the bandwidth, processing, and/or storage capacity of the server(s) at the data collection facility. Accordingly, in some examples, a media monitoring entity may implement multiple different data collection facilities located at different geographic locations, each with respective server(s) to receive reference media data from different ones of the reference media monitoring sites. In some instances, the need for separate collection facilities is defined by different entities (e.g., joint industry committees) that contract with a media monitoring entity to provide audience measurement data for their respective jurisdictions. Some such entities may mandate that the media monitoring entity implement a collection facility specific to and/or within their respective jurisdictions resulting in the need for multiple different collection facilities. Thus, the examples disclosed herein are particularly relevant for monitoring media across geopolitical boundaries between different countries. However, the teachings disclosed herein may be implemented in any situation where multiple collection facilities are established to aggregate data collected from different geographic regions.

In some examples, different ones of multiple data collection facilities may be associated with different geographic regions such that all reference media monitoring sites located within the same region report collected reference media data to the corresponding data collection facility in that area. For purposes of explanation, each geographic area having a designated data collection facility to collect and/or aggregate reference media data obtained by reference media monitoring sites in the area monitoring different media sources is referred to herein as a "designated reference media collection area" or just "reference area" for short. Media monitoring entities may define or designate reference areas in any suitable manner. For example, reference areas may be defined or circumscribed based on natural geographic boundaries (e.g., rivers, mountain ranges, etc.). In other examples, reference areas may be defined based on the locations of cities and/or other population concentrations. In other examples, reference areas may be defined based on geopolitical boundaries such as borders between neighboring states or countries. In some such examples, a particular reference area may correspond to a single geopolitical region (e.g., a single country) or a grouping of multiple geopolitical regions (e.g., multiple countries).

In some examples, each designated reference area includes a designated data collection facility and any number of reference media monitoring sites that report collected reference media data to the data collection facility without regard to the media monitoring occurring in any other reference area. Further in some examples, audience measurement sites (e.g., panelist homes) located within the same designated reference area also transmit collected audience measurement data to the same designated data collection facility. Thus, in some examples, each designated reference area is self-contained to collect the relevant reference media data corresponding to media intended for an audience within the designated reference area to compare with corresponding audience measurement data collected from panelists also located within the reference area exposed to the media. However, in some examples, media intended for an audience within a particular reference area may spillover or leak into another reference area to be viewed by audience members outside the designated reference area.

For example, Italy may be designated as a particular reference area with a corresponding data collection facility to receive reference media data from reference media monitoring sites located throughout the country. Likewise, France may be designated as another reference area with a different data collection facility and different reference media monitoring sites. In some examples, at least some of the reference media monitoring sites in Italy will be tuned to "Rai 1," the flagship television channel of Italy's national public service broadcaster. By contrast, as Rai 1 provides media programming intended for people in Italy, none of the reference media monitoring sites in France will be monitoring the media presented on Rai 1. As a result, there is unlikely to be reference media data corresponding to Rai 1 that is reported to the data collection facility designated for France (unless Rai 1 is presenting the same content also presented via a French media source). This scenario presents a challenge to effective audience measurement because broadcast ranges for over-the-air media (e.g., broadcast television, broadcast radio, etc.) are not limited by geopolitical boundaries such that some individuals (e.g., audience measurement panelists) in France that are relatively close to the Italy border may be able to tune into an over-the-air broadcast of Rai 1 programming. Audience measurement data collected by panelists located in France, but close to the Italy border, will be transmitted to the data collection facility designated for France regardless of whether the audience measurement data corresponds to media originating from Italy (e.g., an over-the-air broadcast of Rai 1). Thus, while some audience measurement data may be received at the France data collection facility corresponding to Rai 1, it is unlikely that the France data collection facility will receive reference media data for the same media because no reference media monitoring site in France is tuned to monitor Rai 1 broadcasts. As a result, the France data collection facility may not be able to identify the media to properly credit exposure and/or otherwise generate associated audience measurement metrics based on the detected media exposure.

Examples disclosed herein overcome the above problems by identifying reference media data collected in a first designated reference area that corresponds to media to which people in a second reference area adjacent the first reference area may be exposed due to the media spilling over a boundary between the two reference areas. In some examples, such reference media data is sent to the data collection facility associated with the adjacent reference area in addition to being collected at the data collection facility for the first designated reference area (e.g., the area where the media originated). As used herein, adjacent refers to both directly adjacent (e.g., both areas share a common boundary) and merely in proximity to or nearby though not directly adjacent (e.g., a narrow region lies between the boundaries of each of the areas). In some examples, the reference media monitoring site that collected the reference media data is configured to send the reference media data to the data collection facility of the nearby reference area. In other examples, the data collection facility designated for the reference media monitoring site (e.g., in the same reference area) is configured to forward the reference media data to the other data collection facility after receiving it from the reference media monitoring site. While all reference media data collected from all media monitoring sites in one reference area could be provided to adjacent reference areas, such an approach unnecessarily provides more data to each collection facilities designated for each reference area than is needed. In particular, transmitting all data from all reference sites results in much greater volume of data transmissions than necessary, thereby reducing efficiency and imposing burdens on bandwidth, processing, and storage capacity of the corresponding data collection facilities.

Accordingly, examples disclosed herein identify only relevant reference media data from particular ones of the reference media monitoring sites in one reference area for reporting to another reference area based on the location of the reference media monitoring sites. In particular, if a reference media monitoring site within a particular reference area is located within a threshold distance of a boundary of the reference area, the reference media data generated by the media monitoring site may be identified for sharing with the data collection facility of an adjacent reference area on the opposite side of the boundary as well as the designated data collection facility associated with the same reference area where the media monitoring site is located. For example, if a reference media monitoring site is located in Italy within 5 miles of the France-Italy border, the reference media data collected by the reference media monitoring site may be provided to the data collection facilities associated with both France and Italy because Italy-based media monitored by the reference media monitoring site (assumed to originate from a source close to the monitoring site) may be spilling over into France. By contrast, reference media data collected by a media monitoring site located in Naples, Italy (hundreds of miles from France) would only be transmitted to the Italy data collection facility because no person in France would be exposed to the corresponding media being monitored.

In some examples, reference media data from a particular reference media monitoring site may be transmitted to more than two data collection facilities. For example, if the reference media monitoring site is located within a threshold distance of the intersection of the French, Italian, and Swiss borders, the corresponding reference media data collected by the reference media monitoring site may be transmitted to the data collection facility designated for each such country.

By implementing the teachings disclosed herein, media originating from a first reference area that spills over into an adjacent or nearby reference area may be accounted for in both the first reference area and the adjacent reference area by providing corresponding reference media data to the data collection facilities associated with each reference area. As a result, the crediting of exposure to media spilling over reference area boundaries can be accomplished to improve audience measurement metrics in the reference areas. At the same, in some examples, reference media data that is not relevant to the adjacent reference area (e.g., corresponding to media that does not spillover into the adjacent reference area) is not transmitted to the data collection facility of the adjacent reference area. As a result, each data collection facility is provided with all relevant reference media data without being bogged down by irrelevant reference media data, thereby improving the efficiency with which each the data collection facility may be implemented. Although media that spills over into a reference area other than the source of the media may be credited with exposure to audience members, in some examples, the media is identified without crediting exposure. That is, crediting of exposure may be intended for media sources originating in the designated reference area for which a data collection facility aggregates audience measurement data to compare with aggregated reference media data. In some such examples, collecting reference media data for media spilling over into the designated reference area from external media sources is nevertheless beneficial to identify otherwise unidentifiable audience measurement data. For example, there is often some portion of audience measurement data collected at audience measurement site that for one reason or another cannot be identified. If the portion of unknown data becomes too great for a particular panelist, the statistical significance of the audience measurement data collected from that panelists is lowered and the reliability of the resulting audience measurement metrics are undermined. The examples disclosed herein provide relevant reference media data to different data collection facilities to improve the identification of media based on audience measurement data, thereby reducing the portion of unknown audience measurement data and improving the resulting audience measurement metrics.

An example method includes determining whether a reference media monitoring site located in a first reference area is within a threshold distance of a second reference area. The reference media monitoring site providing reference media data to a first data collection facility associated with the first reference area. The example method further includes transmitting the reference media data to a second data collection facility associated with the second reference area if the reference media monitoring site is within the threshold distance.

An example tangible computer readable storage medium comprising instructions that, when executed, cause a machine to at least determine whether a reference media monitoring site located in a first reference area is within a threshold distance of a second reference area. The reference media monitoring site to provide reference media data to a first data collection facility associated with the first reference area. The example instructions further cause the machine to transmit the reference media data to a secondary data collection facility associated with the second reference area if the reference media monitoring site is within the threshold distance.

An example apparatus includes a boundary monitoring site identifier to determine whether a reference media monitoring site located in a first reference area is within a threshold distance of a second reference area. The reference media monitoring site to provide reference media data to a first data collection facility associated with the first reference area. The example apparatus further includes a communication interface to transmit the reference media data to a second data collection facility associated with the second reference area if the reference media monitoring site is within the threshold distance.

FIG. 1 illustrates an example environment 100 in which the teachings disclosed herein may be implemented. The example environment 100 includes three designated reference media collection areas 102, 104, 106 corresponding to different geographic regions defined by boundary lines 108. In some examples, the reference areas 102, 104, 106 correspond to different countries and the boundary lines 108 correspond to the borders of the countries. In other examples, the reference areas 102, 104, 106 may correspond to other geopolitical regions (e.g., different states, groups of countries, etc.) and/or reference areas defined in any other manner.

In the illustrated example, located within the first reference area 102 are a number of different reference media monitoring sites 110*a-f* established and maintained by a media monitoring entity. Each of the media monitoring sites 110*a-f* are located and configured to collected reference media data corresponding to media (e.g., radio, television, Internet, etc.) broadcast in the area of each respective reference media monitoring site 110*a-f*. Although six are shown, any number of reference media monitoring sites 110 may be distributed throughout the first reference area 102 to enable the media monitoring entity to collect all relevant reference media data provided throughout the first reference area 102. As shown in the illustrated example, each of the reference media monitoring sites 110*a-f* report or transmit collected reference media data to a centralized data collection facility 112 designated for the first reference area 102. In some examples, the data collection facility 112 also receives audience measurement data from audience measurement sites (e.g., homes of panelists) located within the first reference area 102. In some examples, the data collection facility 112 aggregates the reference media data and uses it to analyze the audience measurement data and determine audience measurement metrics.

As with the first reference area 102 of the illustrated example, the second reference area 104 includes a number of reference media monitoring sites 114*a-g* located throughout the second reference area 104. The reference media monitoring sites 114*a-g* of the illustrate example are configured to collect reference media data corresponding to media originating from the second reference area 104. In some such examples, the reference media data is transmitted to a data collection facility 116 designated for the second reference area 104 to be aggregated and analyzed along with audience measurement data collected from audience measurement sites located within the second reference area 104. Additionally, as with the first and second reference areas 102, 104 of the illustrated example, the third reference area 106 includes a number of reference media monitoring sites 118*a-h* located throughout the third reference area 106. The reference media monitoring sites 118*a-h* of the illustrate example are configured to collect reference media data corresponding to media originating from the third reference area 106. In some such examples, the reference media data is transmitted to a data collection facility 120 designated for the third reference area 106 to be aggregated and analyzed along with audience measurement data collected from audience measurement sites located within the third reference area 106.

Thus, as shown in the illustrated example of FIG. 1, each of the reference areas 102, 104, 106 are effectively self-contained for purposes of audience measurement. That is, each reference area 102, 104, 106 has its own reference media monitoring sites 110*a-f*, 114*a-g*, 118*a-h* that are configured to collect reference media data originating from the corresponding reference area 102, 104, 106 and report the collected reference media data to a designated data collection facility 112, 116, 120 in each reference area 102, 104, 106. However, exposure to media within each reference area is not necessarily so easily divided. For instance, over-the-air broadcasts cannot be limited to concretely defined boundaries such that media broadcasts originating from one reference area may spill over into other reference areas. As such, individuals close to a reference area boundary or boundary line 108 may be exposed to media from a source in an adjacent reference area (e.g., on the other side of the boundary line 108).

Example media sources 122, 124, 126, 128 in the example environment 100 are represented as broadcast towers with circles representative of the broadcast range for the media originating from each media source 122, 124, 126, 128. In some examples, each of the reference media monitoring sites 110a-f, 114a-g, 118a-h is configured to monitor media provided by at least one media source different than those monitored by every other reference media monitoring site. Thus, in some examples, there are at least as many media sources as there are media monitoring sites. However, only four media sources 122, 124, 126, 128 are represented in FIG. 1 for purposes of simplicity and explanation. Further, although media sources 122, 124, 126, 128 are represented as towers broadcasting over-the-air media (e.g., broadcast television, broadcast radio, etc.), in some examples, the reference media monitoring sites may be configured to monitor other forms of media as well (e.g., cable television, satellite television, media delivered via the Internet, etc.).

As shown in the illustrated example, the first three media sources 122, 124, 126 are located sufficiently close to the boundary lines 108 between adjacent ones of the reference areas 102, 104, 106 such that the broadcast range extends across the boundary line 108. In particular, the first media source 122 is located in the second reference area 104 substantially next to the boundary line 108 between the first and second reference areas 102, 104. As a result, a substantial portion of the broadcast range of the media source 122 extends into the first reference area 102. As such, even though the media provided from the media source originates in the second reference area 104, a person located within the first reference area 102 (e.g., within the broadcast range of the first media source 122) may be exposed to the corresponding media. If the person is an audience measurement panelist, audience measurement data corresponding to the media would be reported to the data collection facility 112 designated for the first reference area 102. However, reference media data corresponding to the media in the illustrated example is collected at the reference media monitoring site 114b and reported to the data collection facility 116 associated with the second reference area 104. As a result, the audience measurement data received at the data collection facility 112 may not be identifiable because the data collection facility 112 does not also receive the corresponding reference media data within which the audience measurement data is to be compared and matched. Accordingly, there is a need to provide the reference media data collected at the reference media monitoring site 114b (located in the second reference area 104) to the data collection facility 112 associated with the first reference area 102.

Notably, the reference media monitoring site 110c is located within the first reference area 102 and within the broadcast range of the media source 122 located in the second reference area 104. However, the reference media monitoring site 110c would not typically be tuned to monitor media from the media source 122 because the media is not originating from the same reference area as the reference media monitoring site 110c. Rather, the reference media monitoring site 110c of the illustrated example may be monitoring media originating from a source located in the first reference area 102 that may have a broadcast range extending into the second reference area 104 in a similar manner as represented by the media source 122 described above.

In some examples, the broadcast range of a media source may span more than two reference areas. For instance, the second media source 124 of the illustrated example is located in the second reference area 104 close to the intersection between the first, second, and third reference areas 102, 104, 106. In the illustrated example, the reference media monitoring site 114c is configured to monitor media provided by the second media source 124 and report resulting reference media data to the designated data collection facility 116 for the second reference area 104. However, because of the proximity of the media source 124 to the boundaries of both the first and third reference areas 102, 106, there is the possibility that a person located in either of those reference areas may be exposed to the media. If the person is an audience measurement panelist, the resulting audience measurement data collected from the media will be sent to the corresponding data collection facility of the reference area where the person is located (e.g., the data collection facility 112 if the person is located in the first reference area 102 and the data collection facility 120 if the person is located in the third reference area 106). Accordingly, there is a need to provide the reference media data collected at the reference media monitoring site 114c (located in the second reference area 104) to the data collection facility 112 associated with the first reference area 102 and the data collection facility 120 associated with the third reference area 106 to be able to identify the media potentially reported in audience measurement data from panelists located in either of the first or third reference areas 102, 106 within range of the media source 124.

In the illustrated example of FIG. 1, the third media source 126 is located in the third reference area 106 near the boundary line 108 between the second and third reference areas 104, 106. Unlike the first media source 122, which is nearly against the boundary between the first and second reference areas, the third media source 126 is at some distance from the regional boundary such that only the edge of the broadcast range reaches into the second reference area 104. As a result, there is only a small area in which an audience measurement site (e.g., the home of an audience panelist) located in the second reference area 104 may sufficiently close to tune in to media provided from the third media source 126. Thus, the position of the third media source 126, in the illustrated example, represents an upper limit of the distance between a media source and an adjacent boundary that would give rise to the need to transmit reference media data (e.g., collected at the reference media monitoring site 118c in the illustrated example) from the reference area where the media source is located (e.g., the third reference area 106) to an adjacent reference area (e.g., the second reference area 104). That is, if the third media source 126 was any further away from the boundary line 108 between the second and third reference areas 104, 106, the broadcast range for the third media source 126 would be entirely within the third reference area 106. As a result, there would no longer be a need to provide corresponding reference media data to other data collection facilities of other reference areas because there would be no risk of a person in those other reference areas being exposed to the media. An example media source that is only associated with a single reference area is represented by the media source 128 in the first reference area 102 of the illustrated example.

The particular broadcast range of a media source and, thus, the distance away from a reference area boundary the media source must be before there is little or no risk of exposure of media by audience members across the boundary in an adjacent reference area depends on many factors. For example, broadcast range can depend on the type of signal being used, the strength of the signal, the type of receiver being used, interference from other signals, the physical terrain and/or other obstructions involved, weather conditions, and so forth. Accordingly, in some examples, an upper limit for a transmission distance beyond which most or all broadcast signals cannot be satisfactorily received may be established such that all media sources within the upper limit are assumed to have broadcast ranges that extend into adjacent reference areas. Frequently, a media monitoring entity that implements the reference media monitoring sites 110a-f, 114a-g, 118a-h and maintains the data collection facilities 112, 116, 120 may not know the precise locations of the media sources the reference media monitoring sites are monitoring. As such, it may not be possible to determine whether reference media data needs to be routed to multiple data collection facilities based on a distance between reference area boundaries and media sources. Accordingly, in some examples, identifying reference media data to be shared with multiple data collection facilities is determined based on the location of reference media monitoring sites, which would be known (or easily determinable) by the media monitoring entity, as described more fully below in connection with FIG. 2.

In some examples, audience member panelists may be provided with portable media meters to enable media monitoring entities to track exposure of such panelists regardless of their location (e.g., when they are outside of their home). In some such examples, there is the possibility that panelists living in a first reference area will cross borders into a second reference area and, thus, be exposed to media originating from a source in the second reference area that is more than the threshold distance defined above as determined by the broadcast range of the media source. In some examples, the reason for crossing a border may be that the panelist lives in the first reference area but works in the second reference area. Accordingly, in some examples, the threshold distance from a reference area boundary is determined based on the determined broadcast range of a media source plus an upper limit of a commute distance. While the maximum distance that a person commutes to work may not be known, any suitable distance (e.g., 30 miles, 50 miles, etc.) may be defined that is expected to account for most if not all possibilities. In some examples, the commute distance may take into account the location of population centers (e.g., cities) relative to reference area boundaries. For example, if a major city is located near a border, it may be assumed that any people commuting to work from across the border work within the city and not beyond such that the estimated commute distance may be less than along a border where there is no city or other population center nearby.

Figure 2:
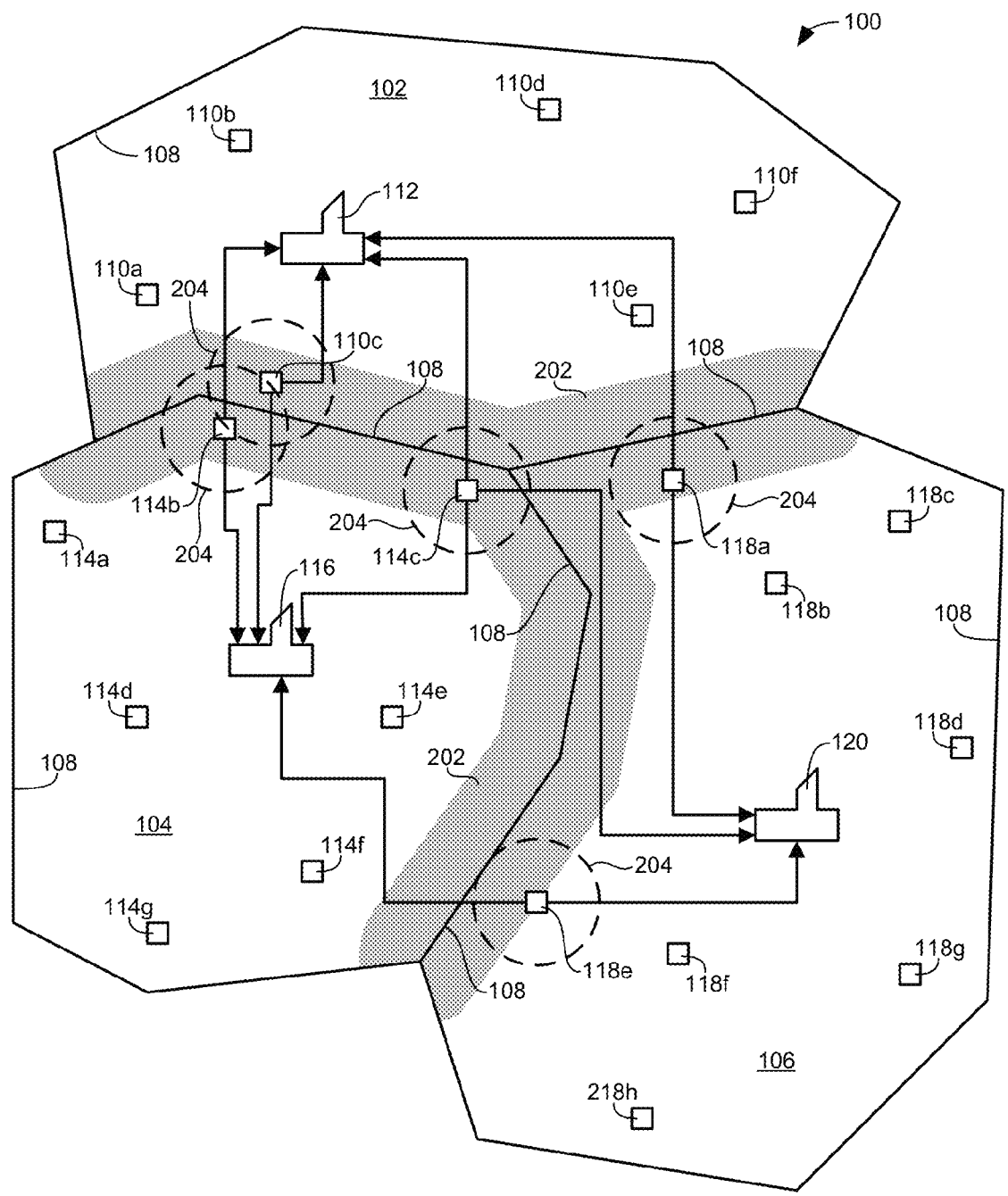
FIG. 2 illustrates the example environment of FIG. 1, with some of the example reference sites configured to report reference media data to multiple data collection facilities.

FIG. 2 illustrates the example environment 100 of FIG. 1, with some of the example reference media monitoring sites 110a-f, 114a-g, 118a-h reporting collected data to multiple data collection facilities 112, 116, 120, as represented by the illustrated arrows. In the illustrated examples, the arrows representative of reporting paths of reference media monitoring sites that only report to the data collection facility in the same reference area are omitted for clarity. Thus, as shown in the illustrated example, only the reference media monitoring sites 110c, 114b, 114c, 118a, 118e located relatively close (e.g., within a threshold distance) to the boundary lines 108 between adjacent reference areas 102, 104, 106 transmit their collected reference media data to more than one data collection facilities 112, 116, 120. In some examples, reference media monitoring sites from which reference media data is to be shared with multiple data collection facilities are identified based on their proximity to the boundary lines 108. Reference media monitoring sites that are identified as collecting reference media data to be reported to multiple data collection facilities because of their proximity to a boundary line 108 are referred to herein as "boundary monitoring sites." In some examples, boundary monitoring sites are identified based on having locations falling within a geographic region along the boundary lines 108 between each set of adjacent reference areas 102, 104, 106 (represented by a shaded portion 202) covering locations within a threshold distance of the boundary lines. In other examples, the boundary monitoring sites are identified directly (e.g., without determining the threshold distance region illustrated by the shaded area 202) by determining whether nearby reference area boundaries are within a threshold distance of each reference media monitoring site (e.g., whether the boundary lines 108 enter circles 204 shown in FIG. 2 indicative of the threshold distance around each monitoring site).

In some examples, the value for the threshold distance is defined to identify any reference media monitoring site that is sufficiently close to a reference area boundary such that the media being monitored may be spilling over the boundary into an adjacent reference area. For a media source (e.g., the media sources 122, 124, 126, 128) to broadcast media that may be received across a reference area boundary, the media source must be within a distance of the boundary corresponding to the distance travelled by the broadcast before it can no longer be adequately received (e.g., the broadcast range). In some examples, a media source may be broadcasting media in all directions such that the media may reach and travel beyond a boundary in one direction and reach a media monitoring reference site located in the opposite direction. Thus, in some examples, the threshold distance inside of which a reference media monitoring site may be identified for sharing collected data with data collection facilities designated for adjacent reference areas is twice the distance travelled by a broadcast (or the full span of the broadcast range from a media source). For example, if a broadcast cannot be adequately received beyond 10 miles from the source of the broadcast, the threshold distance may be defined as 20 miles. As indicated above, there are many factors that impact the range of a broadcast. Accordingly, in some examples, different threshold distances may be determined where one or more of the factors are known or assumed. For instance, in some examples, the distance at which a broadcast can be adequately received is approximated based on the distance from a media source at which a person using a typical commercially available receiver would consider consuming the media because the media can be reception provides sufficient clarity (e.g., lack of static). In other examples, the threshold distance may be defined independent of any specific consideration of broadcasts range at any suitable distance (e.g., 2 miles, 5 miles, 25 miles, etc.).

This upper limit based on twice the distance of a broadcast is represented in the illustrated example by the media source 126 in the third reference area 106 of FIG. 1, which has a broadcast range barely extending into the second reference area 104 on one side and barely reaching the reference media monitoring site 118e on the other side away from the boundary line 108. Thus, the reference media monitoring site 118e is situated at the threshold distance away from the boundaries 108 within which media from the media source 126 still spills over into the adjacent reference area 104. Accordingly, as shown in FIG. 2, the reference media monitoring site 118e sits on the outer edge of the threshold distance region illustrated by the shaded area 202 and has a corresponding circle 204 (indicative of a threshold distance away from the monitoring site) that just reaches the boundary line 108. In some such scenarios, as is illustrated in FIG. 2, the reference media monitoring site 118e is designated as a boundary monitoring site that is to report collected reference media data to the data collection facility 116 in the second reference area 104 in addition to the designated data collection facility 120 associated with its own reference area (e.g., the third reference area 106).

In some examples, the reference media monitoring site 118e may be located at (or just within) the threshold distance, as illustrated, while the media source 126 is located some place other than directly between the reference media monitoring site 118e and the boundary 108 (e.g., parallel to or further away from the boundary 108 than the reference media monitoring site 118e but still within broadcast range of the reference media monitoring site 118e). In such examples, media broadcast by the media source 126 would not actually spill over into the adjacent reference area because the media source 126 would be too far away from the boundary 108. Thus, the positioning of the media source 126 and the reference media monitoring site 118e in FIG. 1 is representative of the upper limit for a monitoring site monitoring media that may spill over a boundary but is a relatively unlikely scenario. Accordingly, in some examples, the threshold distance is defined to be less than twice the distance of a broadcast of media. In other examples, the threshold distance is defined to be greater than twice the distance of a broadcast to build in a margin of error and ensure all relevant reference media data is reported even to each reference area. Thus, the particular threshold distance defined may be altered depending upon balancing the desire to capture all relevant reference media data while reducing (e.g., minimizing) the reporting of irrelevant reference media data that may never be used because the corresponding media does not actually spill over into the reference area to which the data is reported.

As shown in the illustrated example of FIG. 2, each of the reference media monitoring sites 110c, 114b, 118a are well within the shaded area 202 and have corresponding circles 204 that extend across proximate boundary lines 108. As such, in the illustrated examples, the reference media monitoring sites 110c, 114b, 118a are boundary monitoring sites. As such, each of the reference media monitoring sites 110c, 114b, 118a is configured to share their collected reference media data with the designated data collection facility 112, 116, 120 associated with the reference area 102, 104, 106 in which they are located as well as the data collection facility 112, 116, 120 associated with the reference area 102, 104, 106 opposite the proximate regional boundary. As shown in FIG. 2, each of the reference media monitoring sites 110c, 114b are within the circle 204 of the other such that they could potentially monitor the same media (e.g., provided from the media source 122 shown in FIG. 1). However, in some examples, each of the reference media monitoring sites 110c, 114b are configured to monitor different media sources providing media originating in their corresponding reference area 102, 104. As such, despite their proximity to each other, both the reference media monitoring sites 110c, 114b in the illustrated example transmit reference media data to each of the data collection facilities 112, 116 associated with the corresponding reference areas 102, 104.

In the illustrated example of FIG. 2, the reference media monitoring sites 114c is well within the threshold distance region of the shaded area 202 and, thus, is designated as a boundary monitoring site sharing its reference media data with multiple data collection facilities. Further, as shown by the circle 204 around the reference media monitoring site 114c, the reference media monitoring site 114c (located in the second reference area 104) is within the threshold distance of both the first and third reference areas 102, 106. Accordingly, as shown in the illustrated example, the reference media monitoring site 114c provides its collected reference media data to each of the data collection facilities 112, 116, 120 in each of the three reference areas 102, 104, 106.

In some examples, the threshold distance and/or the corresponding threshold regions is defined to identify any reference media monitoring site that is sufficiently close to a reference area boundary such that the media being monitored may be exposed to a person that lives in an adjacent reference area but commutes into the area where the media originates. In some such examples, an upper limit for a commuter distance may be assumed. Thus, if most commuters were assumed to commute no further than 30 miles to work, the threshold region of the illustrated example would be expanded away from the reference boundary lines 108 by an additional 30 miles. In some examples, the upper limit for the assumed commuter distance is determined based on the location of population concentrations (e.g., cities) relative to the reference boundary lines.

The illustrated example of FIG. 2 shows each of the reference media monitoring sites 110c, 114b, 114c, 118a, 118e providing reference media data to the respective data collection facilities associated with the reference area in which they are located as well as transmitting the data to the data collection facilities of the adjacent reference areas. However, in other examples, each of the data collection facilities 112, 116, 120 transmits the reference media data received from each of the reference media monitoring sites 110c, 114b, 114c, 118a, 118e to the other data collection facilities 112, 116, 120 as needed. That is, in some examples, each of the reference media monitoring sites 110a-f, 114a-g, 118a-h provide their corresponding reference media data only to the designated data collection facility 112, 116, 120 associated with the reference area 102, 104, 106 where each monitoring site is located. In such examples, the data collection facility 112, 116, 120 in each reference area 102, 104, 106 then identifies relevant reference media data (received from identified boundary monitoring sites) for sharing with the other data collection facilities. For instance, rather than the reporting paths shown by the arrows in FIG. 2, in some examples, the data collection facility 112 of the first reference area 102 transmits the reference media data received from the reference media monitoring site 110c to the data collection facility 116 of the second reference area 104. Likewise, the data collection facility 116 of the second reference area 104 transmits the reference media data received from the reference media monitoring sites 114b, 114c to the data collection facility 112 of the first reference area 102. Further, the data collection facility 116 of the second reference area 104 transmits the reference media data received from the reference media monitoring sites 114c to the data collection facility 120 of the third reference area 106. Finally, in such examples, the data collection facility 120 of the third reference area 106 transmits the reference media data received from the reference media monitoring sites 118a, 118e to the data collection facilities 112, 116 of the first and second reference areas 102, 104, respectively.

In some examples, the reference media monitoring sites are smart in that they are capable of determining their location, determining whether the collected reference media data should be transmitted to multiple data collection facilities based on their location (e.g., if they are within a threshold distance of a boundary line 108), and transmitting the reference media data to each such data collection facility. In some such examples, the data collection facility designated for each reference area may be non-smart in that it receives the reference media from each such reference media monitoring site without consideration to the location of the reference media monitoring sites from which the reference media data is received. In other examples, the data collection facilities may smart such that they are able to keep track of the reference media data received from monitoring sites beyond the designated reference area for each data collection facility. Additionally or alternatively, in some examples, the data collection facilities are smart in that they are capable of determining the location of the reference media monitoring sites located in their designated reference areas, determining whether the collected reference media data from each such monitoring site should be transmitted to additional data collection facilities (e.g., if the monitoring sites are within a threshold distance of a boundary line 108), and transmitting the reference media data to each such additional data collection facility. In some such examples, the reference media monitoring sites are non-smart in that they collect and report reference media data without consideration to their location or proximity to adjacent reference areas as that determination is handled by the corresponding data collection facility.

Figure 3:
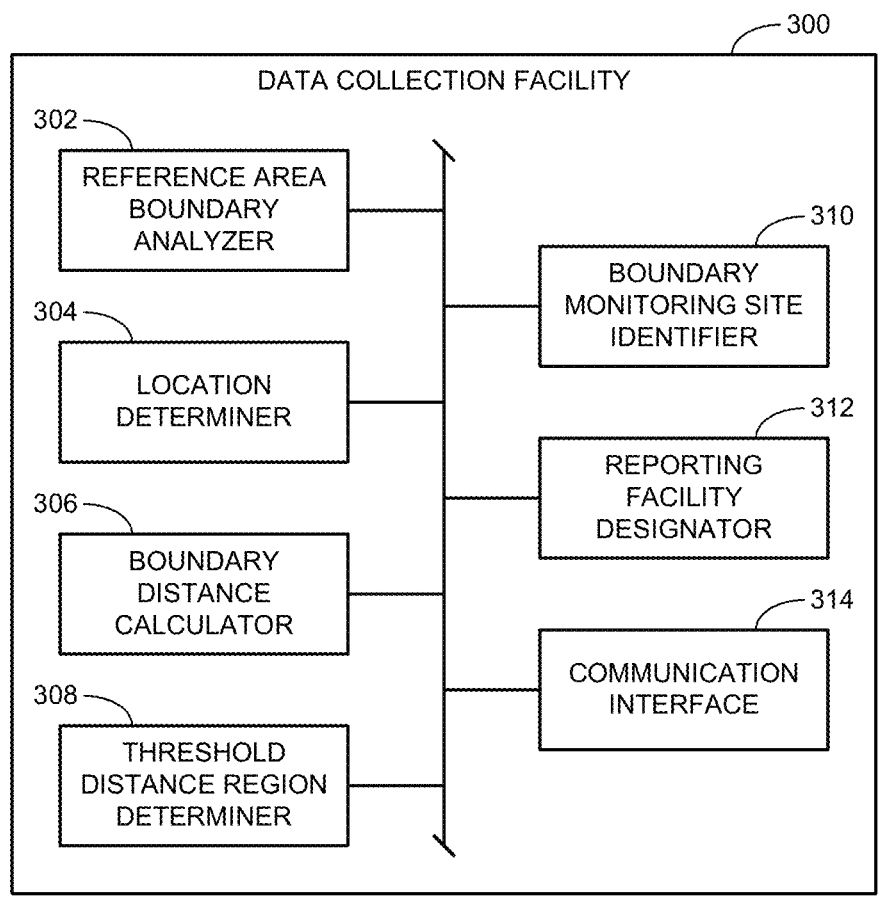
FIG. 3 illustrates an example implementation of one of the data collection facilities of FIGS. 1 and/or 2.

FIG. 3 illustrates an example implementation of a data collection facility 300 corresponding to any one of the data collection facilities 112, 116, 120 of FIGS. 1 and/or 2. The data collection facility 300 of the illustrated example includes an example reference area boundary analyzer 302, an example location determiner 304, an example boundary distance calculator 306, an example threshold distance region determiner 308, an example boundary monitoring site identifier 310, an example reporting facility designator 312, and an example communication interface 314.

In the illustrated example of FIG. 3, the example data collection facility 300 is provided with the reference area boundary analyzer 302 to generate a model of the boundaries and/or borders of adjacent reference areas (e.g., the reference areas 102, 104, 106). In some examples, a boundary-model is generated to define the location of boundaries between reference areas to determine the proximity of reference media monitoring sites. That is, to identify reference media monitoring sites as boundary monitoring sites (that collect reference media data that is to be shared across a reference area boundary), not only are the locations of the reference media monitoring sites needed but the location of the boundaries as well. In some examples, the boundary-model may be based on precise cartographic data with thousands, or even millions, of global position system (GPS) coordinate points following along the contours of the reference area boundaries to precisely define the boundary between adjacent reference areas. In other examples, approximations of the reference area boundaries (e.g., based on an interconnected series of 100-mile-long lines) may be used to generate a boundary-model used in subsequent analysis. In some such examples, the threshold distance may be greater than in the precise boundary-model to account for any inaccuracies in the model. In other examples, a boundary-model may be generated based on GPS coordinates of major (or minor) cities and/or other population concentrations defining the extent of each reference area.

In some examples, the reference area boundary analyzer 302 generates a boundary-model exclusive for the reference area in which the data collection facility 300 is located. In other examples, the data collection facility 300 may generate a boundary-model of multiple (e.g., all) reference areas for which a media monitoring entity is monitoring media. As such a multi-area boundary-model is applicable to the analysis of each reference area, in some examples, the data collection facility 300 generates the boundary-model and provides it to other data collection facilities. Alternatively, in some examples, the data collection facility 300 receives and/or retrieves (e.g., via the communication interface 314) the boundary-model generated at a different location (e.g., at a different data collection facility).

In the illustrated example of FIG. 3, the example data collection facility 300 is provided with the location determiner 304 to determine the location (e.g., GPS coordinates) of the reference media monitoring sites located within the same reference area as the data collection facility 300. In some examples, the location determiner 304 may determine the location of reference media monitoring sites located in multiple (e.g., all) reference areas in which a media monitoring entity is monitoring media. In some examples, the location for each reference media monitoring site is determined based on the geocoding of a street address for each reference media monitoring site. In some examples, the location for each reference media monitoring site is determined based on Internet Protocol (IP) address location data associated with each monitoring site. In some examples, the location for each reference media monitoring site is less precisely determined based on the geocoding of a city in which each reference media monitoring site is located. In some examples, the location for each reference media monitoring site is determined based on a GPS reading taken at each reference media monitoring site. In some examples, the location determiner 304 of the data collection facility 300 does not directly determine the location of each reference media site but is provided with such information from another source (e.g., via the communication interface). For instance, in some examples, each reference media monitoring site may be configured to determine its own location and report such information to the data collection facility 300.

In the illustrated example of FIG. 3, the example data collection facility 300 is provided with the boundary distance calculator 306 to calculate a shortest distance between each reference media monitoring site and the boundaries of the reference area (defined by the boundary-model) in which the reference media monitoring site is located. In some examples, multiple distances are calculated for each reference media monitoring site corresponding to the shortest distance between the reference media monitoring site and each different reference area adjacent the reference area where the monitoring site is located.

In the illustrated example of FIG. 3, the example data collection facility 300 is provided with the threshold distance region determiner 308 to determine the geographic region along the boundary of the reference area (defined by the boundary-model) extending a threshold distance into the area (e.g., the shaded area 202 in each of the reference areas 102, 104, 106 of FIG. 2).

In the illustrated example of FIG. 3, the example data collection facility 300 is provided with the boundary monitoring site identifier 310 to identify the reference media monitoring sites that are boundary monitoring sites. That is, the boundary monitoring site identifier 310 determines whether reference media monitoring sites are within a threshold distance of the adjacent reference area such that media for which the monitoring site is collecting reference media data may be broadcasting into the adjacent reference area. In some examples, the reference media monitoring sites are identified or designated as boundary monitoring by determining whether the distance(s) calculated by the boundary distance calculator 306 are less than a threshold. Additionally or alternatively, in some examples, the reference media monitoring sites are identified as boundary monitoring sites if the locations of the reference media monitoring sites fall within the threshold distance region determined by the threshold distance region determiner 308. As the identification of reference media monitoring sites as boundary monitoring sites may be determined in either of the above methods, in some examples, the data collection facility 300 includes only one of the boundary distance calculator 306 or the threshold distance region determiner 308 while the other is omitted.

In the illustrated example of FIG. 3, the example data collection facility 300 is provided with the reporting facility designator 312 to identify and/or designate the data collection facilities to which reference media data collected at the reference media monitoring sites is to be reported. Each data collection facility designated to receive such data is referred to herein as a reporting facility of the corresponding reference media monitoring site. In some examples, the data collection facility 300 is automatically designated as a reporting facility of the reference media monitoring sites in the same reference area as the data collection facility 300. However, whether other data collection facilities are designated as additional reporting facilities for the reference media monitoring sites depends upon whether the reference media monitoring sites are boundary monitoring sites (e.g., as determined by the boundary monitoring site identifier 310). In particular, in some examples, the reporting facility designator 312 determines which adjacent reference area(s) an identified boundary monitoring site is within a threshold distance and designates the data collection facilities for such adjacent reference area(s) as reporting facilities for the boundary monitoring site. In some examples, such a determination may be communicated to the respective reference media monitoring site to be configured to provide its collected reference media data to the identified reporting facilities. In other examples, the data collection facility 300 may forward the reference media data received from such boundary monitoring sites to the designated reporting facilities.

In the illustrated example of FIG. 3, the example data collection facility 300 is provided with the communication interface 314 to communicate with the reference media monitoring sites in the same reference area as the data collection facility 300 (e.g., to receive and aggregate reference media data collected throughout the reference area). In some examples, the communication interface 314 enables the data collection facility 300 to communicate with the reference media monitoring sites in other reference areas (e.g., to receive and aggregate reference media data from monitoring sites located outside but within a threshold distance of the reference area (e.g., boundary monitoring sites in an adjacent reference area)). In some examples, the communication interface 314 enables the data collection facility 300 to communicate with other data collection facilities designated for other reference areas (e.g., to receive relevant reference media data collected from other monitoring sites in the other reference areas).

In some examples, as mentioned above, one or more of the reference area boundary analyzer 302, the location determiner 304, the boundary distance calculator 306, the threshold distance region determiner 308, the boundary monitoring site identifier 310, and/or the reporting facility designator 312 may be omitted from the data collection facility 300 of FIG. 3. In some such examples, the data generated by the one or more of the reference area boundary analyzer 302, the location determiner 304, the boundary distance calculator 306, the threshold distance region determiner 308, the boundary monitoring site identifier 310, and/or the reporting facility designator 312 is nevertheless provided to the data collection facility 300 from another source via the communication interface 314. For example, as described more fully below in connection with FIG. 4, in some examples, each individual reference media monitoring site may implement equivalent functionality to the reference area boundary analyzer 302, the location determiner 304, the boundary distance calculator 306, the threshold distance region determiner 308, the boundary monitoring site identifier 310, and/or the reporting facility designator 312. That is, in some examples, as described below, each individual reference media monitoring site may determine its location, determine a distance to the nearest reference area boundary, and/or determine whether its collected reference media data is to be shared with multiple data collection facilities based on whether it is within a threshold distance of the boundary. In such examples, the communication interface 314 of the data collection facility 300 may receive an indication from each monitoring site of which other data collection facilities the reference media data (also reported to the data collection facility 300) is to be transmitted.

While an example manner of implementing the data collection facilities 102, 104, 106 of FIGS. 1 and 2 is illustrated by the example data collection facility 300 of FIG. 3, one or more of the elements, processes and/or devices illustrated in FIG. 3 may be combined, divided, re-arranged, omitted, eliminated and/or implemented in any other way. Further, the example reference area boundary analyzer 302, the example location determiner 304, the example boundary distance calculator 306, the example threshold distance region determiner 308, the example boundary monitoring site identifier 310, the example reporting facility designator 312, the example communication interface 314, and/or, more generally, the example data collection facility 300 of FIG. 3 may be implemented by hardware, software, firmware and/or any combination of hardware, software and/or firmware. Thus, for example, any of the example reference area boundary analyzer 302, the example location determiner 304, the example boundary distance calculator 306, the example threshold distance region determiner 308, the example boundary monitoring site identifier 310, the example reporting facility designator 312, the example communication interface 314, and/or, more generally, the example data collection facility 300 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example reference area boundary analyzer 302, the example location determiner 304, the example boundary distance calculator 306, the example threshold distance region determiner 308, the example boundary monitoring site identifier 310, the example reporting facility designator 312, and/or the example communication interface 314 is/are hereby expressly defined to include a tangible computer readable storage device or storage disk such as a memory, a digital versatile disk (DVD), a compact disk (CD), a Blu-ray disk, etc. storing the software and/or firmware. Further still, the example data collection facility 300 may include one or more elements, processes and/or devices in addition to, or instead of, those illustrated in FIG. 3, and/or may include more than one of any or all of the illustrated elements, processes and devices.

Figure 4:
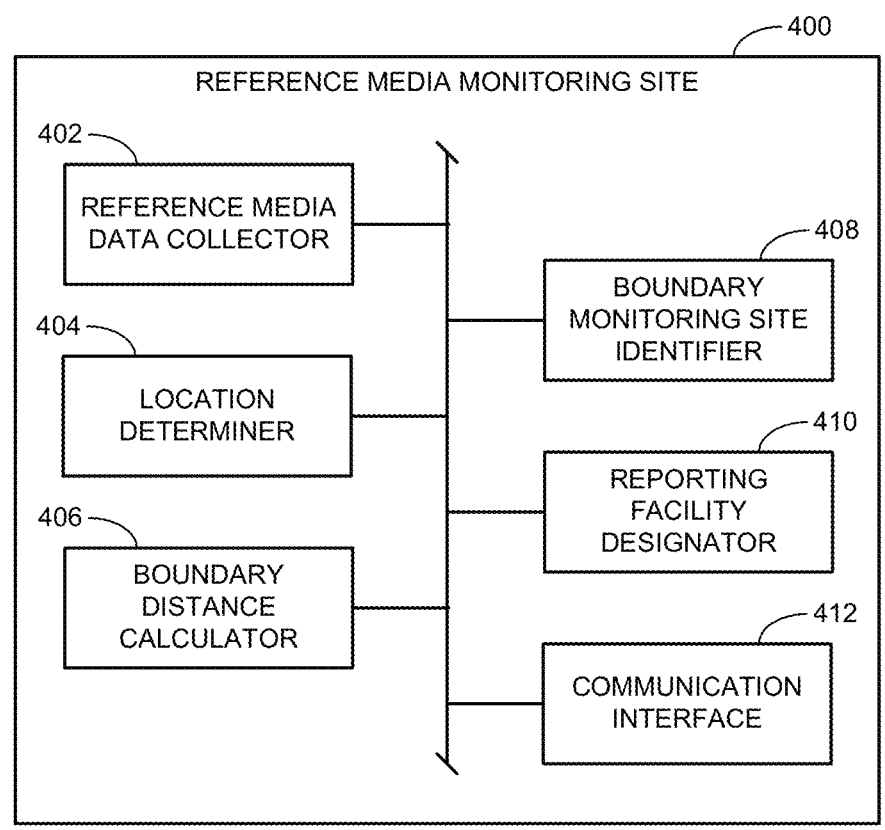
FIG. 4 illustrates an example implementation of one of the reference media monitoring sites of FIGS. 1 and/or 2.

FIG. 4 illustrates an example implementation of a reference media monitoring site 400 corresponding to one of the reference media monitoring site 110a-f, 114a-g, 118a-h of FIGS. 1 and/or 2. The reference media monitoring site 400 of FIG. 4 includes an example reference media data collector 402, an example location determiner 404, an example boundary distance calculator 406, an example boundary monitoring site identifier 408, an example reporting facility designator 410, and an example communication interface 412.

In the illustrated example of FIG. 4, the example reference media monitoring site 400 is provided with the reference media data collector 402 to collected reference media data (e.g., codes and/or signatures) from a particular media source. In some examples, the reference media data collector 402 includes multiple receivers to collect reference media data from multiple media sources. Systems and methods to implement the example reference media data collector 402 are known in the art and, therefore, will not be described in detail herein. For instance, example methods and apparatus to implement the example reference media data collector 402 are described in U.S. Pat. No. 4,677,466 issued on Jun. 30, 1987; U.S. Pat. No. 5,481,294 issued on Jan. 2, 1996; U.S. Pat. No. 7,460,684 issued on Dec. 2, 2008; U.S. Pat. No. 8,457,972 issued on Jun. 4, 2013, U.S. Pat. No. 8,600,531 issued on Dec. 3, 2013; U.S. Patent Application Publication No. 2005/0232411 published on Oct. 20, 2005; U.S. Patent Application Publication No. 2006/0153296 published on Jul. 13, 2006; U.S. Patent Application Publication No. 2006/0184961 published on Aug. 17, 2006; U.S. Patent Application Publication No. 2006/0195861 published on Aug. 31, 2006; U.S. Patent Application Publication No. 2007/0274537 published on Nov. 29, 2007; U.S. Patent Application Publication No. 2008/0091288 published on Apr. 17, 2008; U.S. Patent Application Publication No. 2008/0276265 published on Nov. 6, 2008; U.S. Patent Application Publication No. 2013/0261781 published on Oct. 3, 2013; U.S. Patent Application Publication No. 2014/0088742 published on Mar. 27, 2014; and U.S. patent application Ser. No. 14/511,805 filed on Oct. 10, 2014, all of which are hereby incorporated by reference in their entireties.

In the illustrated example of FIG. 4, the example reference media monitoring site 400 is provided with the location determiner 404 to determine the location (e.g., GPS coordinates) of the reference media monitoring site 400. In some examples, the location of the reference media monitoring site 400 is determined based on a GPS reading taken at each reference media monitoring site. In some examples, the location determiner 404 determines the location by a geocoding of the street address of the reference media monitoring site 400. In some examples, the location is determined less precisely based on a geocoding of the city where the reference media monitoring site 400 is located.

In the illustrated example of FIG. 4, the example reference media monitoring site 400 is provided with the boundary distance calculator 406 to calculate a shortest distance between the location of the reference media monitoring site and the boundaries of the reference area in which the reference media monitoring site 400 is located. In some examples, a boundary-model defining the location of the boundaries of the reference area for such a calculation is provided to the reference media monitoring site 400 via the communication interface 412. In some examples, multiple distances are calculated corresponding to the shortest distance between the reference media monitoring site 400 and each reference area adjacent the reference area where the monitoring site is located.

In the illustrated example of FIG. 4, the example reference media monitoring site 400 is provided with the boundary monitoring site identifier 408 to determine whether the reference media monitoring site 400 is a boundary monitoring site. In some examples, the reference media monitoring site 400 is designated as a boundary monitoring site when the distance to each adjacent reference area, calculated by the boundary distance calculator 406, is less than a threshold distance. Additionally or alternatively, in some examples, the reference media monitoring site 400 is designated as a boundary monitoring site when the location of the reference media monitoring site 400 falls within a threshold distance region along the boundary of an adjacent reference area. In some examples, the threshold distance region is provided to the reference media monitoring site 400 from another source via the communication interface 412 rather than being calculated by the reference media monitoring site 400 because the same threshold distance region may be applicable to multiple monitoring sites.

In the illustrated example of FIG. 4, the example reference media monitoring site 400 is provided with the example reporting facility designator 410 to identify and/or designate the data collection facilities as reporting facilities for the reference media monitoring site 400 to which reference media data collected at the reference media monitoring site is to be reported. In some examples, the data collection facility in the same reference area as the reference media monitoring site 400 is automatically designated as a reporting facility. However, whether other data collection facilities are designated as additional reporting facilities for the reference media monitoring site 400 depends upon whether the reference media monitoring site 400 is identified as a boundary monitoring sites (e.g., as determined by the boundary monitoring site identifier 408). In some examples, if the reference media monitoring site 400 is identified as a boundary monitoring site, the reporting facility designator 410 determines which adjacent reference area(s) the reference media monitoring site 400 is within the threshold distance and designates the data collection facilities for such adjacent reference area(s) as reporting facilities for the reference media monitoring site 400.

In the illustrated example of FIG. 4, the example reference media monitoring site 400 is provided with the communication interface 412 to communicate with the designated reporting facilities. That is, in some examples, the reference media monitoring site 400 transmits collected reference media data to the data collection facility in the same reference area where the reference media monitoring site 400 is located. Further, in some examples, the reference media monitoring site 400 transmits collected reference media data to other data collections facilities in other reference areas if they have been designated as reporting facilities for the monitoring site based on the location of the monitoring site relative to the boundaries of the reference areas in which the other data collection facilities are located (e.g., whether the reference media monitoring site 400 is a boundary monitoring site). However, in examples, where the primary data collection facility (e.g., the data collection facility in the same reference area as the reference media monitoring site 400) transmits the reference media data to the other reporting facilities, the monitoring site may only communicate with the primary data collection facility.

While an example manner of implementing the reference media monitoring sites 110*a*-*f*, 114*a*-*g*, 118*a*-*h* of FIGS. 1 and 2 is illustrated by the example reference media monitoring site 400 of FIG. 4, one or more of the elements, processes and/or devices illustrated in FIG. 4 may be combined, divided, re-arranged, omitted, eliminated and/or implemented in any other way. Further, the example reference media data collector 402, the example location determiner 404, the example boundary distance calculator 406, the example boundary monitoring site identifier 408, the example reporting facility designator 410, the example communication interface 412, and/or, more generally, the example reference media monitoring site 400 of FIG. 4 may be implemented by hardware, software, firmware and/or any combination of hardware, software and/or firmware. Thus, for example, any of the example reference media data collector 402, the example location determiner 404, the example boundary distance calculator 406, the example boundary monitoring site identifier 408, the example reporting facility designator 410, the example communication interface 412, and/or, more generally, the example reference media monitoring site 400 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example reference media data collector 402, the example location determiner 404, the example boundary distance calculator 406, the example boundary monitoring site identifier 408, the example reporting facility designator 410, and/or the example communication interface 412 is/are hereby expressly defined to include a tangible computer readable storage device or storage disk such as a memory, a digital versatile disk (DVD), a compact disk (CD), a Blu-ray disk, etc. storing the software and/or firmware. Further still, the example reference media monitoring site 400 may include one or more elements, processes and/or devices in addition to, or instead of, those illustrated in FIG. 4, and/or may include more than one of any or all of the illustrated elements, processes and devices.

Figure 5:
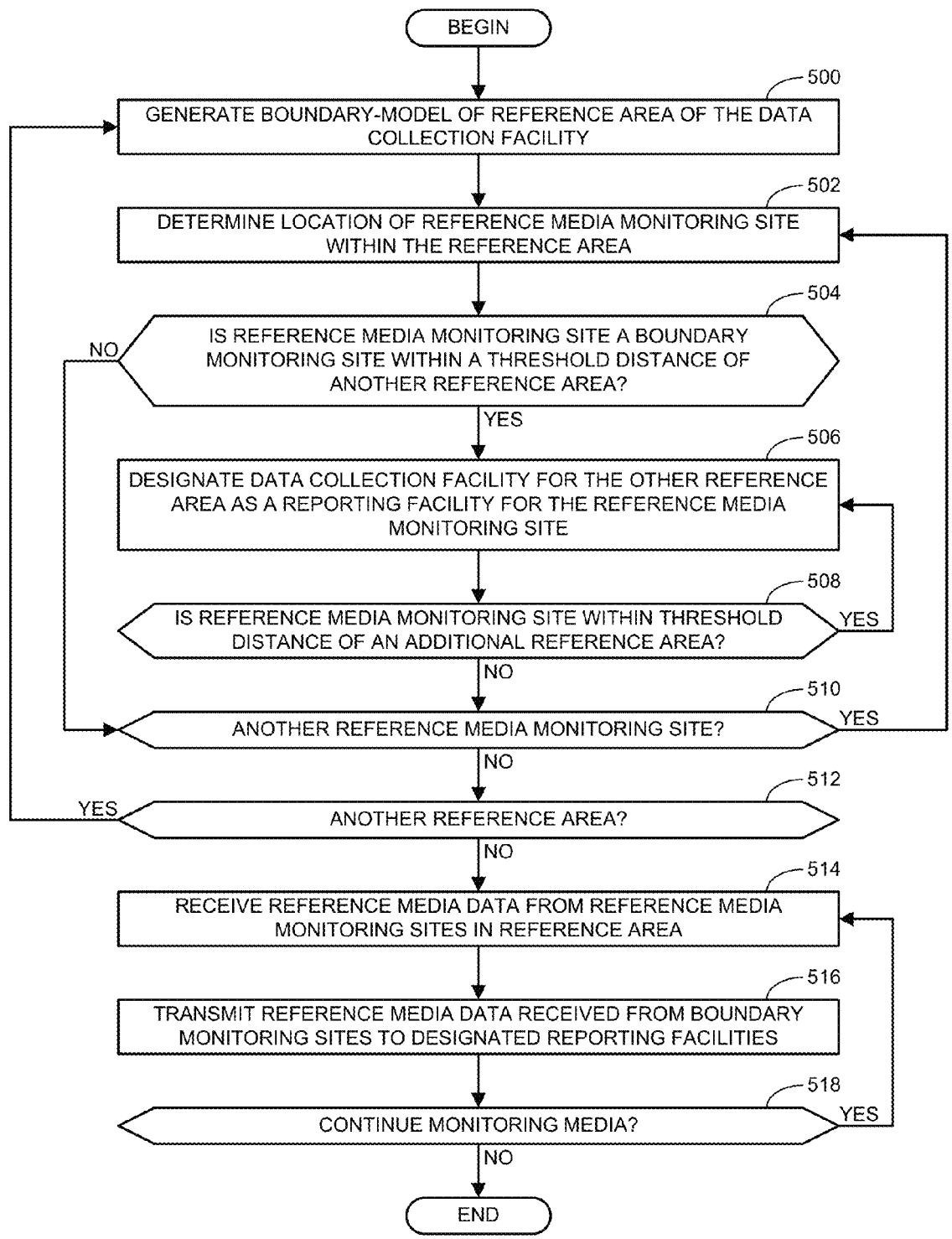
FIG. 5 is a flowchart representative of example machine readable instructions that may be executed to implement any one of the example data collection facilities of FIGS. 1, 2, and/or 3.

A flowchart representative of example machine readable instructions for implementing the data collection facility 300 of FIG. 3 is shown in FIG. 5. In this example, the machine readable instructions comprise a program for execution by a processor such as the processor 712 shown in the example processor platform 700 discussed below in connection with FIG. 7. The program may be embodied in software stored on a tangible computer readable storage medium such as a CD-ROM, a floppy disk, a hard drive, a digital versatile disk (DVD), a Blu-ray disk, or a memory associated with the processor 712, but the entire program and/or parts thereof could alternatively be executed by a device other than the processor 712 and/or embodied in firmware or dedicated hardware. Further, although the example program is described with reference to the flowchart illustrated in FIG. 5, many other methods of implementing the example data collection facility 300 may alternatively be used. For example, the order of execution of the blocks may be changed, and/or some of the blocks described may be changed, eliminated, or combined.

The program of FIG. 5 begins at block 500 where the example reference area boundary analyzer 302 generates a boundary-model of the reference area of the data collection facility 300. At block 502, the example location determiner 304 determines the location of a reference media monitoring site within the reference area. At block 504, the example boundary monitoring site identifier 310 determines whether the reference media monitoring site is a boundary monitoring site within a threshold distance of another reference area. In some examples, this determination is based on whether the reference media monitoring site falls within a threshold distance region along the boundary (determined by the threshold distance region determiner 308). In other examples, this determination is based on whether a shortest distance from the location of the reference media monitoring site to the boundary of the other reference area (as determined by the boundary distance calculator 306) is less than a threshold distance. In some examples, the threshold distance may be a fixed value for all reference media monitoring sites. In other examples, a particular threshold distance for each reference media monitoring site may be determined based on factors affecting the broadcast range for media being monitored by each monitoring site (e.g., the signal type, the signal strength, etc.).

If the example boundary monitoring site identifier 310 determines the reference media monitoring site is a boundary monitoring site (block 504), control advance to block 506 where the example reporting facility designator 312 designates the data collection facility for the other reference area as a reporting facility for the reference media monitoring site. At block 508, the example boundary monitoring site identifier 310 determines whether the reference media monitoring site is within a threshold distance of an additional reference area. If so, control returns to block 506. If not, control advances to block 510. Returning to block 504, if the example boundary monitoring site identifier 310 determines the reference media monitoring site is not a boundary monitoring site, control advance directly to block 510.

At block 510, the example boundary monitoring site identifier 310 determines whether there is another reference media monitoring site to analyze. If so, control returns to block 502. Otherwise, control advance to block 512, where the example reference area boundary analyzer 302 determines whether there is another reference area to analyze. In some examples, each data collection facility performs the example program of FIG. 5 such that there would be no need for any particular data collection facility to analyze the reference area associated with a different data collection facility. However, in some examples, a particular data collection facility may perform the analysis for multiple and/or all reference areas and then distribute the results to the corresponding data collection facilities and/or reference media monitoring sites of the other reference areas. Accordingly, if the example reference area boundary analyzer 302 determines that there is another reference area to analyze (block 512), control returns to block 500. Otherwise, control advances to block 514.

At block 514, the example communication interface 314 receives reference media data from reference media monitoring sites in the reference area. At block 516, the example communication interface 314 transmits the reference media data received from each the boundary monitoring sites to the corresponding designated reporting facilities. In some examples, rather than transmitting the reference media data as outlined in block 516, the example communication interface 314 provides information to each boundary monitoring site to be configured to separately report their corresponding reference media data to designated reporting facilities for each such boundary monitoring site. At block 518, the example communication interface 314 determines whether to continue gathering reference media data. If so, control returns to block 514. Otherwise, the example program of FIG. 5 ends.

Figure 6:
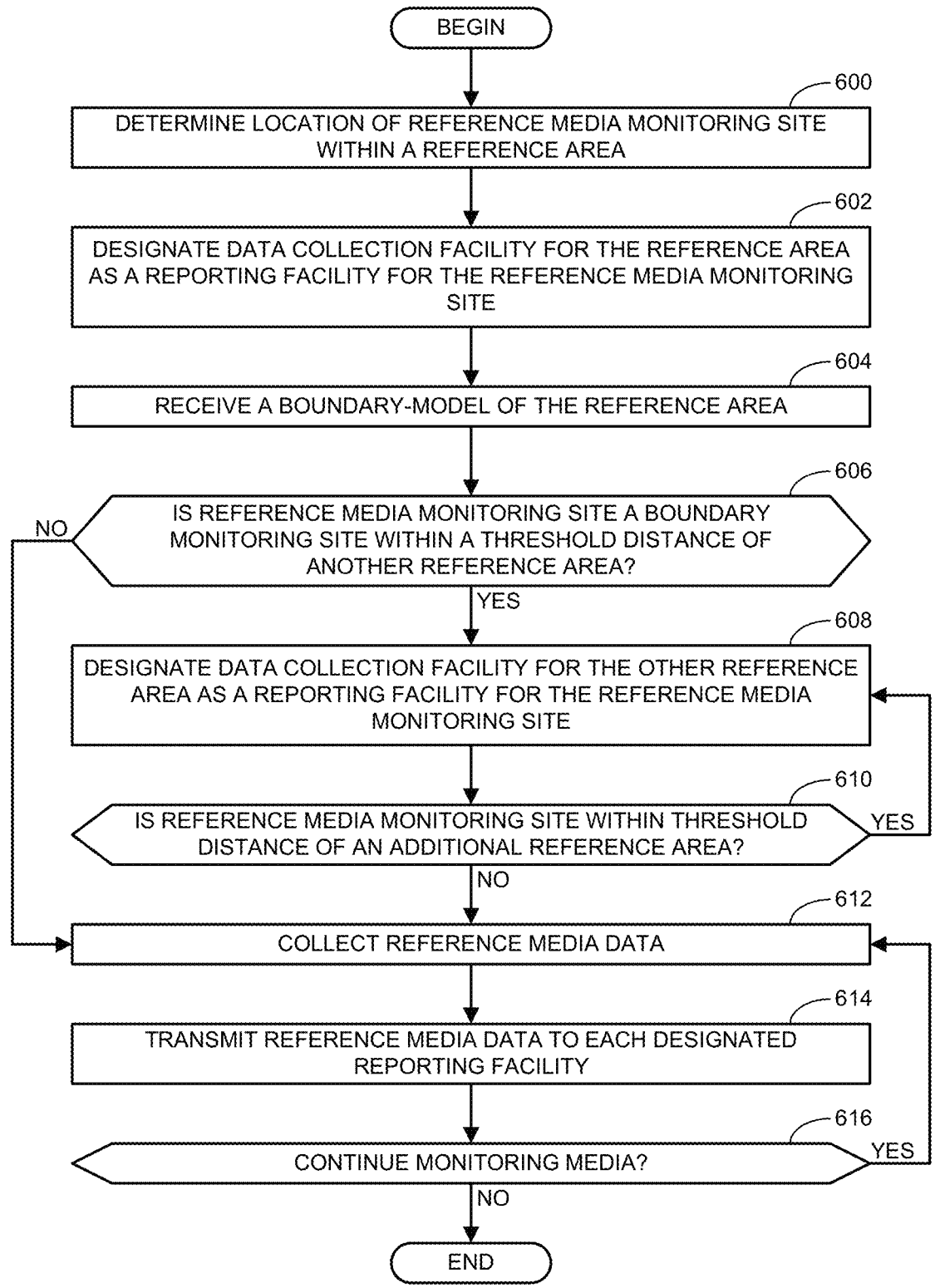
FIG. 6 is a flowchart representative of example machine readable instructions which may be executed to implement any one of the example reference media monitoring sites of FIGS. 1, 2, and/or 4.

A flowchart representative of example machine readable instructions for implementing the reference media monitoring site 400 of FIG. 4 is shown in FIG. 6. In this example, the machine readable instructions comprise a program for execution by a processor such as the processor 812 shown in the example processor platform 800 discussed below in connection with FIG. 8. The program may be embodied in software stored on a tangible computer readable storage medium such as a CD-ROM, a floppy disk, a hard drive, a digital versatile disk (DVD), a Blu-ray disk, or a memory associated with the processor 812, but the entire program and/or parts thereof could alternatively be executed by a device other than the processor 812 and/or embodied in firmware or dedicated hardware. Further, although the example program is described with reference to the flowchart illustrated in FIG. 6, many other methods of implementing the example reference media monitoring site 400 may alternatively be used. For example, the order of execution of the blocks may be changed, and/or some of the blocks described may be changed, eliminated, or combined.

The program of FIG. 6 begins at block 600 where the example location determiner 404 determines the location of the reference media monitoring site 400 within a reference area. At block 602, the example reporting facility designator 410 designates the data collection facility for the reference area as a reporting facility for the reference media monitoring site 400. At block 604, the example communication interface 412 receives a boundary-model of the reference area. At block 606, the example boundary monitoring site identifier 408 determines whether the reference media monitoring site 400 is a boundary monitoring site within a threshold distance of another reference area. In some examples, this determination is based on whether the reference media monitoring site 400 falls within a threshold distance region along the boundary of the other reference area. In some examples, the reference media monitoring site 400 may calculate the threshold distance region as described above with respect to the data collection facility 300. However, because each reference media monitoring site in a reference area may implement the example program of FIG. 6, to avoid redundant processes, in some examples, the threshold distance region is calculated once and provided to each monitoring site as described above. In other examples, this determination is based on whether a shortest distance from the location of the reference media monitoring site 400 to the boundary of the other reference area (as determined by the boundary distance calculator 406) is less than a threshold distance. In some examples, the threshold distance may be a fixed value for all reference media monitoring sites. In other examples, a particular threshold distance for each reference media monitoring site may be determined based on factors affecting the broadcast range for media being monitored by each monitoring site (e.g., the signal type, the signal strength, etc.).

If the example boundary monitoring site identifier 408 determines that the reference media monitoring site is a boundary monitoring site (block 606), control advance to block 608 where the example reporting facility designator 410 designates the data collection facility for the other reference area as a reporting facility for the reference media monitoring site 400. At block 610, the example boundary monitoring site identifier 408 determines whether the reference media monitoring site 400 is within a threshold distance of an additional reference area. If so, control returns to block 608. If not, control advances to block 612. Returning to block 606, if the example boundary monitoring site identifier 408 determines the reference media monitoring site 400 is not a boundary monitoring site, control advance directly to block 612.

At block 612, the example reference media data collector 402 collects reference media data. At block 614, the example communication interface 412 transmits the reference media data to each designated reporting facility. That is, the communication interface 412 transmits the reference media data to the data collection facility in the same reference area in which the reference media monitoring site 400 is located as well as any other data collection facilities for which the reference media monitor site 400 is a boundary monitoring site. At block 616, the example communication interface 412 determines whether to continue collecting reference media data. If so, control returns to block 612. Otherwise, the example program of FIG. 6 ends.

In some examples, a media monitoring entity may maintain thousands of reference media monitoring sites across many designated reference areas (each having dozens if not hundreds of monitoring sites located therein). As a result, the automatic implementation of the example programs of FIGS. 5 and/or 6 by the example data collection facility 300 of FIG. 3 and/or the example reference media monitoring site 400 of FIG. 4 provides substantial efficiencies over a person attempting to identify each reference media monitoring site that is to route its collected reference media data to multiple data collection facilities and then to manually configure the monitoring site and/or the data collection facilities to transmit and receive such data. Indeed, a person has no readily available means to determine the distance of a monitoring site to nearby reference area boundaries. Likewise, a person cannot take into account other factors affecting the range of location, such as signal type or signal strength. Furthermore, many reference media monitoring sites are established at semi-permanent locations (e.g., in closets or other small rented-out spaces of other businesses) such that there locations are moving relatively frequently. As a result, in some examples, the programs of FIGS. 5 and/or 6 need to be repeated on a relatively frequent basis (e.g., every week, every month, every quarter, etc.) such that manual identification of boundary monitoring sites and resulting reconfiguration of such sites as they move locations is impractical and prone to error.

As mentioned above, the example processes of FIGS. 5 and 6 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example processes of FIGS. 5 and 6 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended.

Figure 7:
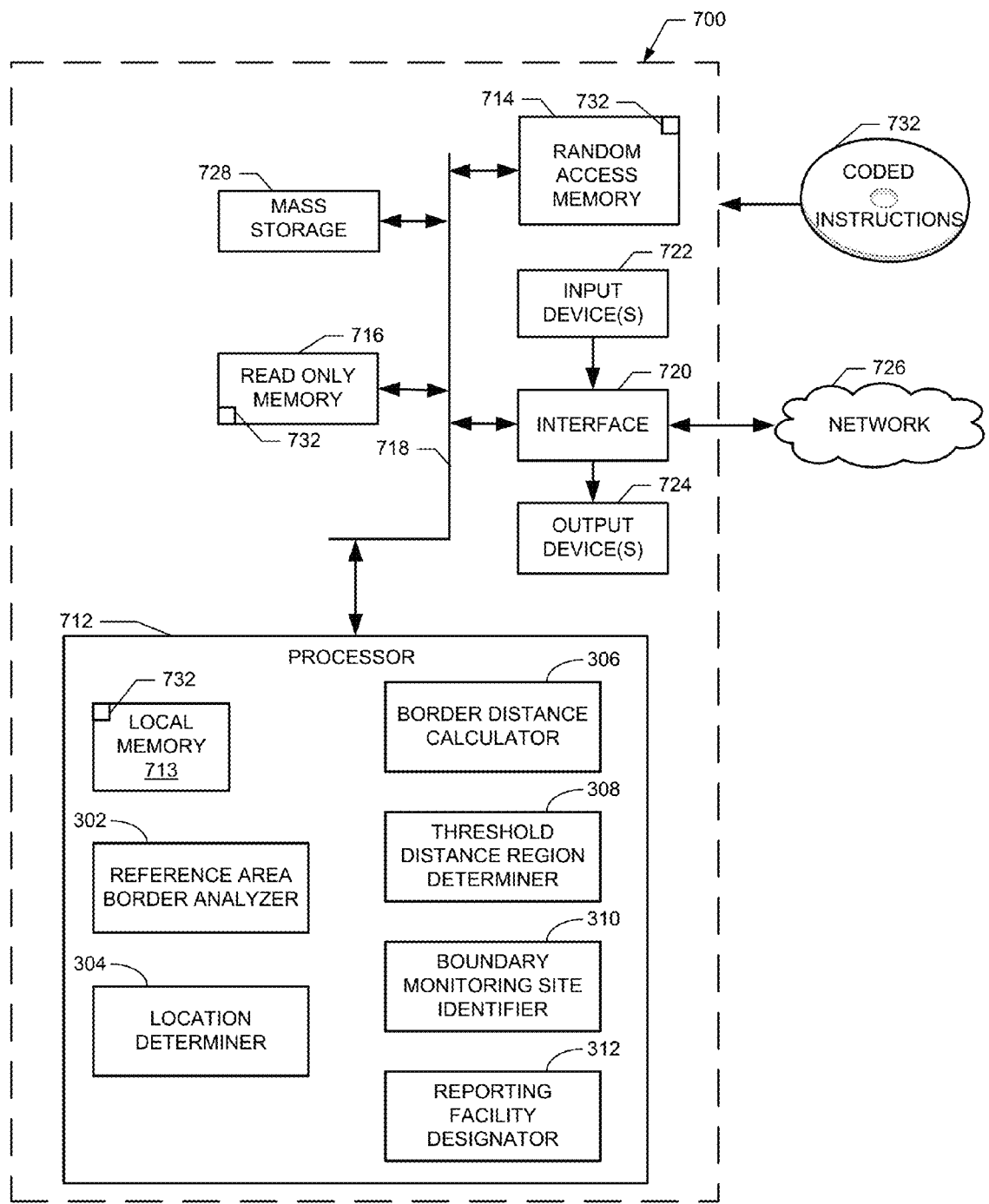
FIG. 7 is a block diagram of an example processor platform structured to execute the instructions of FIG. 5 to implement any one of the example data collection facilities of FIGS. 1, 2, and/or 3.

FIG. 7 is a block diagram of an example processor platform 700 capable of executing the instructions of FIG. 5 to implement the data collection facility of FIGS. 1, 2, and/or 3. The processor platform 700 can be, for example, a server, a personal computer, a mobile device (e.g., a cell phone, a smart phone, a tablet such as an iPad™), a personal digital assistant (PDA), an Internet appliance, or any other type of computing device.

The processor platform 700 of the illustrated example includes a processor 712. The processor 712 of the illustrated example is hardware. For example, the processor 712 can be implemented by one or more integrated circuits, logic circuits, microprocessors or controllers from any desired family or manufacturer.

The processor 712 of the illustrated example includes a local memory 713 (e.g., a cache). In the illustrated example, the processor 712 implements the example reference area boundary analyzer 302, the example location determiner 304, the example boundary distance calculator 306, the example threshold distance region determiner 308, the example boundary monitoring site identifier 310, and the example reporting facility designator 312. The processor 712 of the illustrated example is in communication with a main memory including a volatile memory 714 and a non-volatile memory 716 via a bus 718. The volatile memory 714 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 716 may be implemented by flash memory and/or any other desired type of memory device. Access to the main memory 714, 716 is controlled by a memory controller.

The processor platform 700 of the illustrated example also includes an interface circuit 720. The interface circuit 720 may be implemented by any type of interface standard, such as an Ethernet interface, a universal serial bus (USB), and/or a PCI express interface.

In the illustrated example, one or more input devices 722 are connected to the interface circuit 720. The input device(s) 722 permit(s) a user to enter data and commands into the processor 712. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 724 are also connected to the interface circuit 720 of the illustrated example. The output devices 724 can be implemented, for example, by display devices (e.g., a light emitting diode (LED), an organic light emitting diode (OLED), a liquid crystal display, a cathode ray tube display (CRT), a touchscreen, a tactile output device, a light emitting diode (LED), a printer and/or speakers). The interface circuit 720 of the illustrated example, thus, typically includes a graphics driver card, a graphics driver chip or a graphics driver processor.

The interface circuit 720 of the illustrated example also includes a communication device such as a transmitter, a receiver, a transceiver, a modem and/or network interface card to facilitate exchange of data with external machines (e.g., computing devices of any kind) via a network 726 (e.g., an Ethernet connection, a digital subscriber line (DSL), a telephone line, coaxial cable, a cellular telephone system, etc.).

The processor platform 700 of the illustrated example also includes one or more mass storage devices 728 for storing software and/or data. Examples of such mass storage devices 728 include floppy disk drives, hard drive disks, compact disk drives, Blu-ray disk drives, RAID systems, and digital versatile disk (DVD) drives.

The coded instructions 732 of FIG. 5 may be stored in the mass storage device 728, in the volatile memory 714, in the non-volatile memory 716, and/or on a removable tangible computer readable storage medium such as a CD or DVD.

Figure 8:
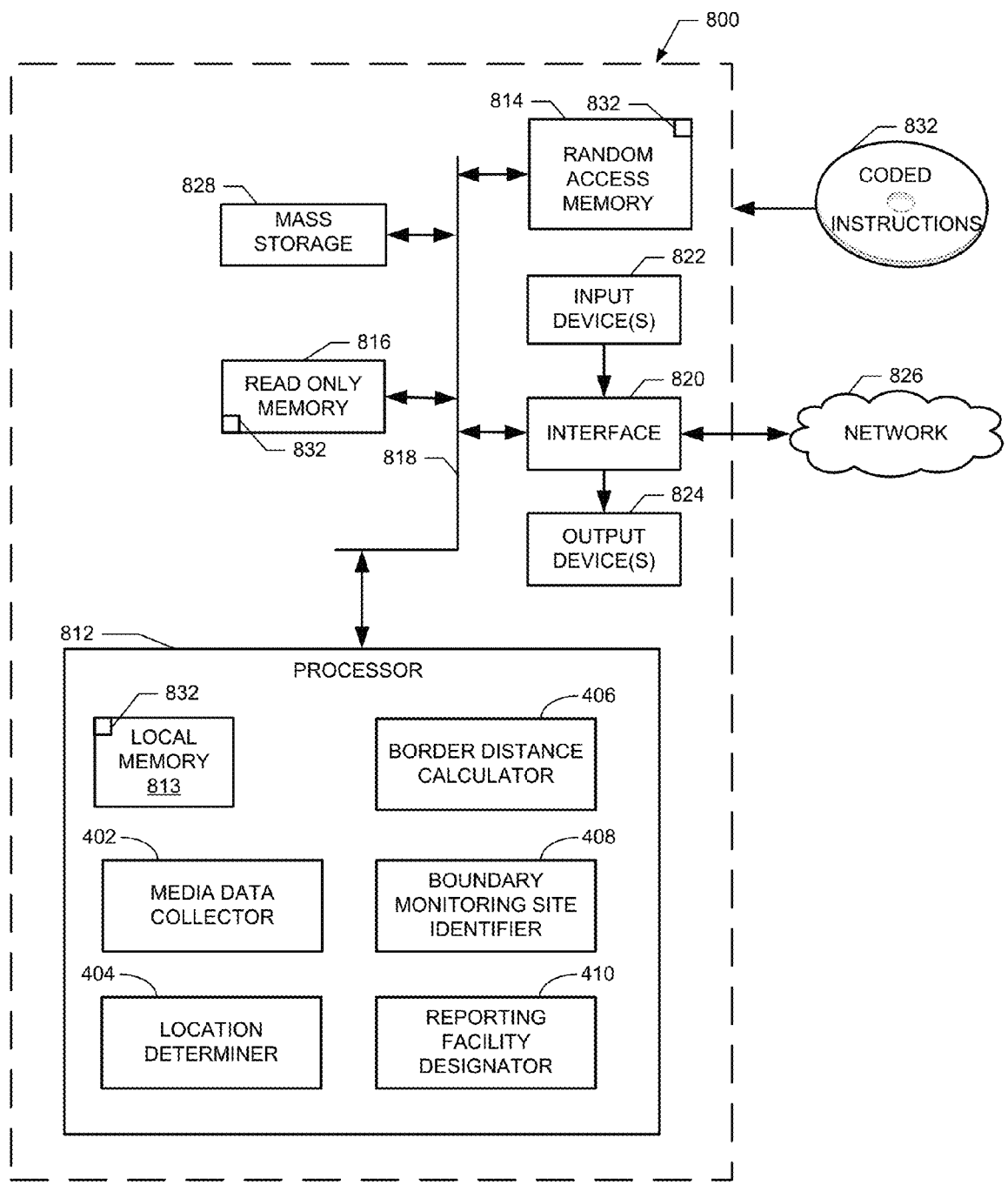
FIG. 8 is a block diagram of an example processor platform structured to execute the instructions of FIG. 6 to implement any one of the example reference media monitoring sites of FIGS. 1, 2, and/or 4.

FIG. 8 is a block diagram of an example processor platform 800 capable of executing the instructions of FIG. 6 to implement the reference media monitoring sites of FIGS. 1, 2, and/or 4. The processor platform 800 can be, for example, a server, a personal computer, a mobile device (e.g., a cell phone, a smart phone, a tablet such as an iPad™), a personal digital assistant (PDA), an Internet appliance, or any other type of computing device.

The processor platform 800 of the illustrated example includes a processor 812. The processor 812 of the illustrated example is hardware. For example, the processor 812 can be implemented by one or more integrated circuits, logic circuits, microprocessors or controllers from any desired family or manufacturer.

The processor 812 of the illustrated example includes a local memory 813 (e.g., a cache). In the illustrated example, the processor 812 implements the example reference media data collector 402, the example location determiner 404, the example boundary distance calculator 406, the example boundary monitoring site identifier 408, and the example reporting facility designator 410. The processor 812 of the illustrated example is in communication with a main memory including a volatile memory 814 and a non-volatile memory 816 via a bus 818. The volatile memory 814 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 816 may be implemented by flash memory and/or any other desired type of memory device. Access to the main memory 814, 816 is controlled by a memory controller.

The processor platform 800 of the illustrated example also includes an interface circuit 820. The interface circuit 820 may be implemented by any type of interface standard, such as an Ethernet interface, a universal serial bus (USB), and/or a PCI express interface.

In the illustrated example, one or more input devices 822 are connected to the interface circuit 820. The input device(s) 822 permit(s) a user to enter data and commands into the processor 812. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 824 are also connected to the interface circuit 820 of the illustrated example. The output devices 824 can be implemented, for example, by display devices (e.g., a light emitting diode (LED), an organic light emitting diode (OLED), a liquid crystal display, a cathode ray tube display (CRT), a touchscreen, a tactile output device, a light emitting diode (LED), a printer and/or speakers). The interface circuit 820 of the illustrated example, thus, typically includes a graphics driver card, a graphics driver chip or a graphics driver processor.

The interface circuit 820 of the illustrated example also includes a communication device such as a transmitter, a receiver, a transceiver, a modem and/or network interface card to facilitate exchange of data with external machines (e.g., computing devices of any kind) via a network 826 (e.g., an Ethernet connection, a digital subscriber line (DSL), a telephone line, coaxial cable, a cellular telephone system, etc.).

The processor platform 800 of the illustrated example also includes one or more mass storage devices 828 for storing software and/or data. Examples of such mass storage devices 828 include floppy disk drives, hard drive disks, compact disk drives, Blu-ray disk drives, RAID systems, and digital versatile disk (DVD) drives.

The coded instructions 832 of FIG. 6 may be stored in the mass storage device 828, in the volatile memory 814, in the non-volatile memory 816, and/or on a removable tangible computer readable storage medium such as a CD or DVD.

From the foregoing, it will be appreciated that the above disclosed methods, apparatus and articles of manufacture enable reference media data collected from multiple reference media monitoring sites to be distributed or routed to one or more appropriate data collection facilities in different reference media collection areas. More particularly, the examples disclosed herein enable the automatic identification and/or configuration of reference media monitoring sites that are within a threshold distance from reference area boundaries to potentially be capturing reference media data associated with media broadcasts that reach (e.g., spill over) into nearby reference areas. Further, the identification of such boundary monitoring sites enables the reporting of the corresponding reference media data to each relevant data collection facility regardless of whether the data collection facilities are in the same or different reference areas. In this manner, the efficiency of each data collection facility is increased because only potentially relevant reference media data is reported while irrelevant data (e.g., associated with media from sources nowhere near the corresponding reference area) are excluded, thereby reducing demands on bandwidth, processing power, and storage. Furthermore, the automatic detection and configuration of such reference media monitoring sites and associated data collection facilities to enables media monitoring entities to quickly account for changes in the location of some of the hundreds or thousands of reference media monitoring sites being maintained that can occur on a relatively frequent basis. Furthermore, the examples disclosed herein improve the accuracy of resulting audience measurement metrics because each data collection facility will have the necessary reference media data to match with any audience measurement data collected from panelists corresponding to media that has spilled over into the corresponding reference area from a nearby reference area.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A method comprising:
determining, by executing an instruction with a processor, whether a reference media monitoring site located in a first reference area is within a threshold distance of a second reference area by:
generating a boundary-model of the first reference area, the boundary-model defining a location of a boundary between the first reference area and the second reference area;
calculating a shortest distance between the reference media monitoring site and the boundary; and
determining whether the reference media monitoring site is within the threshold distance based on a comparison of the shortest distance to the threshold distance, the reference media monitoring site providing reference media data to a first data collection facility associated with the first reference area; and
transmitting the reference media data to a second data collection facility associated with the second reference area if the reference media monitoring site is within the threshold distance.

2. The method of claim 1, wherein the boundary corresponds to a geopolitical border between a first country and a second different country.

3. The method of claim 2, wherein the boundary-model is generated using at least one of a series of coordinate points following contours of the geopolitical border or a series of interconnected lines approximating the contours of the geopolitical border.

4. The method of claim 1, wherein the reference media data is collected from over-the-air media.

5. The method of claim 1, wherein the first reference area is adjacent the second reference area.

6. The method of claim 1, wherein the reference media data is transmitted to the second data collection facility from the reference media monitoring site.

7. The method of claim 1, wherein the reference media data is transmitted to the second data collection facility from the first data collection facility.

8. The method of claim 1, further including:
determining a location of the reference media monitoring site based on at least one of coordinates from a global positioning system measurement, Internet Protocol address location data associated with the reference media monitoring site, geocoding of a street address of the reference media monitoring site, or geocoding of a city where the reference media monitoring site is located; and
determining whether the reference media monitoring site is within the threshold distance based on the location of the reference media monitoring site.

9. A tangible computer readable storage medium comprising instructions that, when executed, cause a machine to at least:
generate a boundary-model of a first reference area, the boundary-model defining a location of a boundary between the first reference area and a second reference area;

calculate a shortest distance between a reference media monitoring site and the boundary, the reference media monitoring site located in the first reference area; and determine whether the reference media monitoring site is within a threshold distance of the second reference area based on a comparison of the shortest distance to the threshold distance, the reference media monitoring site to provide reference media data to a first data collection facility associated with the first reference area; and transmit the reference media data to a secondary data collection facility associated with the second reference area if the reference media monitoring site is within the threshold distance.

10. The tangible computer readable storage medium of claim 9, wherein the boundary corresponds to a geopolitical border between a first country and a second different country.

11. The tangible computer readable storage medium of claim 10, wherein the boundary-model is generated using at least one of a series of coordinate points following contours of the geopolitical border or a series of interconnected lines approximating the contours of the geopolitical border.

12. The tangible computer readable storage medium of claim 9, wherein the reference media data is collected from over-the-air media.

13. The tangible computer readable storage medium of claim 9, wherein the first reference area is adjacent the second reference area.

14. The tangible computer readable storage medium of claim 9, wherein the reference media data is transmitted to the secondary data collection facility from the reference media monitoring site.

15. The tangible computer readable storage medium of claim 9, wherein the reference media data is transmitted to the secondary data collection facility from the first data collection facility.

16. The tangible computer readable storage medium of claim 9, wherein the instructions further cause the machine to:

determine a location of the reference media monitoring site based on at least one of coordinates from a global positioning system measurement, Internet Protocol address location data associated with the reference media monitoring site, geocoding of a street address of the reference media monitoring site, or geocoding of a city where the reference media monitoring site is located; and determine whether the reference media monitoring site is within the threshold distance based on the location of the reference media monitoring site.

17. An apparatus comprising:

a boundary monitoring site identifier to determine whether a reference media monitoring site located in a first reference area is within a threshold distance of a second reference area, the reference media monitoring site to provide reference media data to a first data collection facility associated with the first reference area;

a reference area boundary analyzer to generate a boundary-model of the first reference area, the boundary-model defining a location of a boundary between the first reference area and the second reference area;

a boundary distance calculator to calculate a shortest distance between the reference media monitoring site and the boundary, wherein the boundary monitoring site identifier is to determine whether the reference media monitoring site is within the threshold distance based on a comparison of the shortest distance to the threshold distance; and a communication interface to transmit the reference media data to a second data collection facility associated with the second reference area if the reference media monitoring site is within the threshold distance.

18. The apparatus of claim 17, wherein the boundary corresponds to a geopolitical border between a first country and a second different country.

19. The apparatus of claim 18, wherein the boundary-model is generated using at least one of a series of coordinate points following contours of the geopolitical border or a series of interconnected lines approximating the contours of the geopolitical border.

20. The apparatus of claim 17, wherein the reference media data is collected from over-the-air media.

21. The apparatus of claim 17, wherein the first reference area is adjacent the second reference area.

22. The apparatus of claim 17, wherein the communication interface is part of the reference media monitoring site.

23. The apparatus of claim 17, wherein the communication interface is part of the first data collection facility.

24. The apparatus of claim 17, further including a location determiner to determine a location of the reference media monitoring site based on at least one of coordinates from a global positioning system measurement, Internet Protocol address location data associated with the reference media monitoring site, geocoding of a street address of the reference media monitoring site, or geocoding of a city where the reference media monitoring site is located, wherein the boundary monitoring site identifier is to determine whether the reference media monitoring site is within the threshold distance based on the location of the reference media monitoring site.

* * * * *